(12) United States Patent
Roberts et al.

(10) Patent No.: US 10,860,269 B2
(45) Date of Patent: Dec. 8, 2020

(54) SYSTEMS AND METHODS FOR EFFICIENTLY MANAGING PRINT PROCUREMENT ORDERS BASED ON ITEM-SPECIFIC INTEREST LEVELS AND SUPPLIER-INFLUENCED THRESHOLDS FOR MULTIPLE USERS SIMULTANEOUSLY

(71) Applicant: INNERWORKINGS, INC., Chicago, IL (US)

(72) Inventors: Brian Roberts, Aurora, IL (US); Mark Hilger, Chicago, IL (US); Robert Burkart, Hindsdale, IL (US); Timcy Chacko, Mount Prospect, IL (US)

(73) Assignee: INNERWORKINGS, INC., Chicago, IL (US)

( * ) Notice: Subject to any disclaimer, the term of this patent is extended or adjusted under 35 U.S.C. 154(b) by 0 days.

(21) Appl. No.: 16/688,813

(22) Filed: Nov. 19, 2019

(65) Prior Publication Data

US 2020/0167110 A1    May 28, 2020

Related U.S. Application Data

(63) Continuation of application No. 16/216,917, filed on Dec. 11, 2018, now Pat. No. 10,481,849, which is a
(Continued)

(51) Int. Cl.
*H04N 1/00* (2006.01)
*G06F 3/12* (2006.01)
(Continued)

(52) U.S. Cl.
CPC ......... *G06F 3/1262* (2013.01); *G06Q 10/087* (2013.01); *H04N 1/00923* (2013.01);
(Continued)

(58) Field of Classification Search
CPC .... G06F 3/1262; G06F 3/1205; G06F 3/1204; H04N 1/00923; H04N 1/32555
(Continued)

(56) References Cited

U.S. PATENT DOCUMENTS 8,345,279 B1 * 1/2013 Klatt ................. G06F 15/00
                                                                 358/1.13
2015/0100435 A1   4/2015 Sanio et al.

OTHER PUBLICATIONS

Innerworkings, Inc., International Search Report and Written Opinion, PCT/US2017/028757, dated Jun. 12, 2017, 10 pgs.
Innerworkings, Inc., International Preliminary Report on Patentability, PCT/US2017/028757, dated Oct. 23, 2018, 8 pgs.
Innerworkings, Inc., Examination Report No. 1, AU2017252329, dated Dec. 12, 2018, 2 pgs.
Innerworkings, Inc., Communication Pursuant to Rules 161(1) and 162, EP17720980.6, dated Dec. 5, 2018, 3 pgs.
(Continued)

*Primary Examiner* — Saeid Ebrahimi Dehkordy
(74) *Attorney, Agent, or Firm* — Morgan, Lewis & Bockius LLP

(57) ABSTRACT

Systems and methods of managing print procurement systems are disclosed herein. An example method includes displaying, ordering information for a fixed plurality of items that include a respective user interface (UI) object for each item. The fixed plurality of items are associated with a first time period that spans a start date and an end date for indicating an interest level in items of the fixed plurality of items. The respective UI objects includes a visual representation of an aggregate interest level for each item during the first time period as compared to a threshold interest level for each item. While displaying the respective UI objects, the method includes receiving a first indication that a second user is modifying ordering information for a first item and updating a first UI object for the first item to indicate that the second user is modifying ordering information for the first item.

20 Claims, 46 Drawing Sheets

Related U.S. Application Data continuation of application No. 15/493,483, filed on Apr. 21, 2017, now Pat. No. 10,152,286.

(60) Provisional application No. 62/325,952, filed on Apr. 21, 2016.

(51) Int. Cl.
*G06Q 10/08* (2012.01)
*H04N 1/32* (2006.01)

(52) U.S. Cl.
CPC ....... *H04N 1/32555* (2013.01); *G06F 3/1204* (2013.01); *G06F 3/1205* (2013.01)

(58) Field of Classification Search
USPC ....................................... 358/1.15
See application file for complete search history.

(56) References Cited

OTHER PUBLICATIONS

Innerworkings, Inc., Communication Pursuant to Article 94(3), EP17720980.6, dated Nov. 20, 2019, 6 pgs.
Roberts, Office Action, U.S. Appl. No. 15/493,483, dated Dec. 14, 2017, 12 pgs.
Roberts, Notice of Allowance, U.S. Appl. No. 15/493,483, dated Aug. 6, 2018, 8 pgs.
Roberts, Notice of Allowance, U.S. Appl. No. 16/216,917, dated May 15, 2019, 8 pgs.
Roberts, Notice of Allowance, U.S. Appl. No. 16/216,917, dated Aug. 14, 2019, 9 pgs.

\* cited by examiner

Buy Group Data Structure 322-1

| | Buy Group ID | Buy Group Name | Associated User IDs | Time Period | Associated Item IDs | Associated Location IDs |
|---|---|---|---|---|---|---|
| Header 410-0 | | | | | | |
| Record 410-1 | 1 | September Promo Items | {user1, user2, user3} | 09/09/15 – 03/04/16 | {1, 4, 7, 11} | {3, 4, 5} |
| Record 410-2 | 2 | January Promo Items | {user1, user2} | 09/09/15 – 03/04/16 | {3, 5} | {7, 9} |
| Record 410-3 | 5 | Worldwide Cross-Campaign Items | {user1, user2, user3, user5} | 09/09/15 – 03/04/16 | {12, 1, 2, 6} | {12, 1, 2, 6} |
| Record 410-N | ... | ... | ... | ... | ... | ... |

| Item ID | Buy Group ID | Threshold Interest | Current Interest Levels | Last Edited By |
|---|---|---|---|---|
| 1 | 1 | 300 | {location1: 100, location2: 100, location3: 100} | user1 |
| 2 | 2 | 680 | {location1: 50, location2: 100} | user2 |
| ... | ... | ... | ... | ... |

Item Order Details Data Structure 324-1
Header 510-0
Record 510-1
Record 510-2
Record 510-N

700

| 702 | Receive, from a user of an electronic device that is in communication with a display, a request to view ordering information for a fixed plurality of physical items that are associated with a first time period |

| 704 | The fixed plurality of physical items is not editable by the user and the user cannot add physical items to the fixed plurality |

| 706 | In response to receiving the request, display on the display a respective user interface object for each physical item of the fixed plurality of physical items |

| 708 | A first user interface object for a first physical item includes a visual representation of an aggregate interest level for the first physical item during the first time period as compared to a threshold interest level for the first physical item, and the aggregate interest level reflects a quantity of the first physical item requested by the user and at least one other user |

| 710 | The user and the at least one other user are each associated with distinct shipping locations and the aggregate interest level reflects interest levels across one or more shipping locations, the one or more shipping locations including the distinct shipping locations |

| 712 | The visual representation includes a progress bar and a textual description as to whether the threshold interest level for the first physical item has been met |

| 714 | While displaying the respective user interface objects for each physical item of the fixed plurality of physical items, receive an indication that the threshold interest level for the first physical item has been satisfied |

| 716 | The indication that the threshold interest level for the first physical item has been satisfied is received after a second user, distinct from the user, modifies the ordering information |

| 718 | In accordance with receiving the indication, update the first user interface object to indicate that a threshold-specific price has been secured for the first physical item |

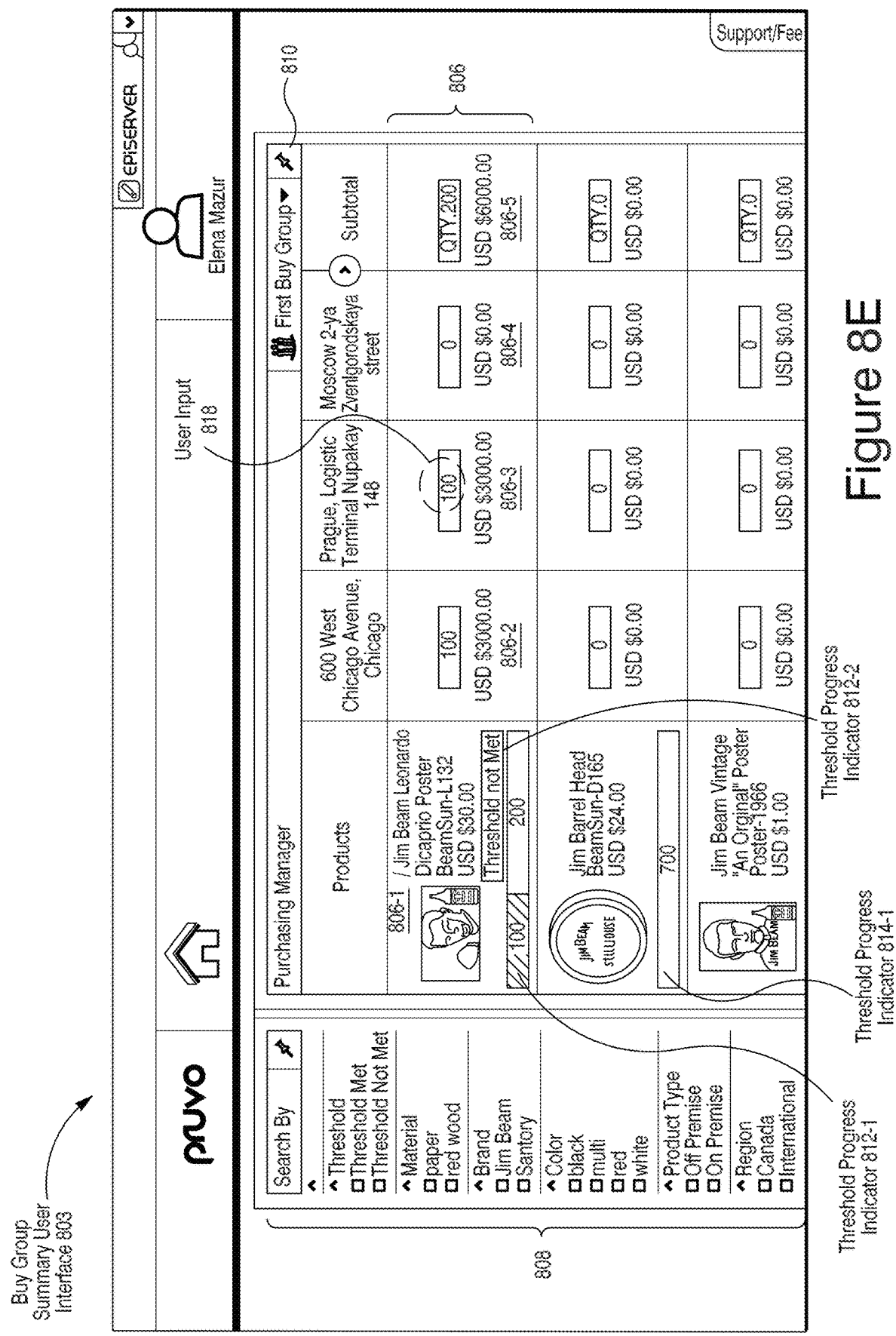

| A1 | ▼ | : | × | ✓ | fx | Items | | | |
|---|---|---|---|---|---|---|---|---|---|

ExportedBuy Group
Ordering Information 916 →

| | A | B | C | D | E | F | G | H |
|---|---|---|---|---|---|---|---|---|
| 1 | Items | Price (USD) | 600 West Chicago Avenue, Chicago | Prague, Logistic Terminal Nupaky 148 | Moscow 2-ya Zvenigordskaya street | Total Quantity | Total (USD) | |
| 2 | Bill Murray Poster | 1 | 0 | 3333 | 0 | 3333 | 3333 | |
| 3 | Total (USD) | | 0 | 3333 | 0 | | 3333 | |

Figure 9D

Import Buy Group User Interface 1042

Buy Group Import [1]

Please choose *.xlsx file and click Import.

[Browse...] No file selected.　[Import]

Buy Group Items Import [2]

Please choose *.xlsx file and click Import.

[Browse...] No file selected.　[Import]

Buy Group Export [3]

Choose Catalog

[▼] [4]

Buy Group Items Export

Choose Buy Group

[▼]

[Start Export]

Figure 10C

| | A | B | C | D | E | F | G | H | I | J | K |
|---|---|---|---|---|---|---|---|---|---|---|---|
| 1 | Buy Group Name | Location1 | Location2 | Location3 | LocationN | Start Date | End Date | Catalog | | | |
| 2 | Buy Group 1 | 1606 W Sunnyside Ave | Target | Binny's | NHL | 1/20/2016 | 2/1/2016 | Beam Suntory | | | |
| 3 | Buy Group 2 | Binny's | 3133 Gresham Lane W | | | 1/20/2016 | 2/1/2016 | Beam Suntory | | | |
| 4 | Buy Group 3 | Target | 3133 Gresham Lane W | | | 1/20/2016 | 2/1/2016 | Beam Suntory | | | |
| 5 | Buy Group 4 | 1300 Milwaukee Ave | 4146 Western Ave | | | 1/20/2016 | 2/1/2016 | Beam Suntory | | | |
| 6 | Buy Group 5 | Target | | | | 1/20/2016 | 2/1/2016 | Beam Suntory | | | |
| 7 | | | | | | | | | | | |
| 8 | | | | | | | | | | | |
| 9 | | | | | | | | | | | |
| 10 | | | | | | | | | | | |

Figure 10D

|   | A | B | C |
|---|---|---|---|
| 1 | Buy Group Name | ItemCode | |
| 2 | Buy Group1 | Item1 | |
| 3 | Buy Group1 | Item2 | |
| 4 | Buy Group1 | Item3 | |
| 5 | Buy Group1 | Item4 | |
| 6 | Buy Group1 | Item5 | |
| 7 | Buy Group2 | Item1 | |
| 8 | Buy Group2 | Item3 | |
| 9 | Buy Group2 | Item4 | |
| 10 | Buy Group2 | Item6 | |
| 11 | Buy Group2 | Item7 | |
| 12 | | | |
| 13 | | | |
| 14 | | | |
| 15 | | | |
| 16 | | | |

Figure 10E

|   | A | B | C | D | E | F |
|---|---|---|---|---|---|---|
| 1 | Action | User Name | Buy Group | | | |
| 2 | Insert | broberts@company.com | Buy Group 1 | | | |
| 3 | Delete | broberts@company.com | Buy Group 2 | | | |
| 4 | Insert | rvollrath@company.com | Buy Group 1 | | | |
| 5 | Insert | remazur@company.com | Buy Group 2 | | | |
| 6 | Insert | meright@company.com | Buy Group 1 | | | |
| 7 | | | | | | |
| 8 | | | | | | |
| 9 | | | | | | |
| 10 | | | | | | |
| 11 | | | | | | |
| 12 | | | | | | |

SYSTEMS AND METHODS FOR EFFICIENTLY MANAGING PRINT PROCUREMENT ORDERS BASED ON ITEM-SPECIFIC INTEREST LEVELS AND SUPPLIER-INFLUENCED THRESHOLDS FOR MULTIPLE USERS SIMULTANEOUSLY

RELATED APPLICATION

This application is a continuation of U.S. patent application Ser. No. 16/216,917, filed Dec. 11, 2018, entitled "Systems and Methods for Efficiently Managing Print Procurement Orders Using an Available-Groups User Interface that is Updated to Reflect Changes to Item-Specific Interest Levels in Each Available Group," which is a continuation of U.S. patent application Ser. No. 15/493,483, filed on Apr. 21, 2017, entitled "Systems and Methods for Efficiently Managing Print Procurement Orders Based on Item-Specific Interest Levels and Supplier-Influenced Thresholds," which claims priority to U.S. Provisional Patent Application No. 62/325,952, filed Apr. 21, 2016, entitled "Systems and Methods for Efficiently Managing Print Procurement Orders Based on Item-Specific Interest Levels and Supplier-Influenced Thresholds," each of which is herein fully incorporated by reference in its respective entirety.

TECHNICAL FIELD

The disclosed embodiments relate generally to managing print procurement systems and, in particular, to efficiently managing print procurement orders based on item-specific interest levels and supplier-influenced thresholds.

BACKGROUND

Some print procurement systems allow suppliers of printing services to connect with consumers of printing services. Some print procurement systems allow the consumers (or an entity working on their behalf) to provide detailed specifications related to a printing job. These detailed specifications are then used by some print procurement systems to match the printing job with a supplier that is capable of fulfilling the printing job.

In certain circumstances, consumers of printing services within multinational organizations place similar orders at different times. For example, a first group within the multinational organization places an order for a particular poster and a second group within the same multinational organization places an order for the same particular poster at a later date (e.g., two months later). In some cases, because the first and second groups are located on different continents and/or because the orders are placed on different dates, combining the orders is not feasible. There is a need, therefore, for print procurement systems that allow for assessing interest levels for particular items across a large organization, in order to efficiently and easily allow for combining orders.

SUMMARY

Without limiting the scope of the appended claims, after considering this disclosure, and particularly after considering the section entitled "Description of Embodiments," one will understand how the aspects of various embodiments are implemented and used to address the above deficiencies and other problems associated with print procurement systems.

Some embodiments efficiently manage print procurement orders based on item-specific interest levels and supplier-influenced thresholds. In some embodiments, an electronic device (e.g., a user computing device 102, FIG. 1) receives, from a user of the electronic device, a request to view ordering information for a fixed plurality of physical items (also referred to herein as a "buy group") that are associated with a first time period (e.g., a start date and an end date for indicating an interest in one or more items of the fixed plurality of physical items of the buy group). In response to receiving the request, the electronic device displays on a display that is in communication with the electronic device a respective user interface object for each physical item of the fixed plurality of physical items. A first user interface object for a first physical item includes a visual representation of an aggregate interest level (also referred to herein as an "item-specific interest level") for the first physical item during the first time period as compared to a threshold interest level for the first physical item, and the aggregate interest level reflects a quantity of the first physical item requested by the user and at least one other user. While displaying the respective user interface objects for each physical item of the fixed plurality of physical items, the electronic device receives an indication that the threshold interest level for the first physical item has been satisfied. In accordance with receiving the indication, the electronic device updates the first user interface object to indicate that a threshold-specific price has been secured for the first physical item. In this way, a print procurement system is able to assess interest levels in items that are part of a buy group, in order to allow organizations to place efficient orders (e.g., in order to take advantage of ordering thresholds required by suppliers to achieve lower price points for each item in the buy group).

Thus, disclosed embodiments herein make the exceedingly difficult task of assessing interest levels across large, multinational organizations for print procurement items straightforward and, thereby, allow for efficiently placed orders that take advantage of time-sensitive and threshold-specific sales for particular print procurement items (based on current offers from suppliers in the print procurement system). Users of print procurement systems are able to rely on the disclosed embodiments to determine when to place orders for particular items in order to take advantage of the current offers and based on what other users within a particular organization are currently ordering. This enables users to make better, well-informed, and cost-effective business decisions concerning print procurement items.

(A1) More specifically, some embodiments include a method that is performed at an electronic device (e.g., one or more of the user computing devices 102, FIG. 1) with one or more processors and memory. The electronic device may include a display (e.g., such as a touch-sensitive display) and/or may be in communication with a display (e.g., an external monitor). The method includes: receiving, from a user of the electronic device, a request to view ordering information for a fixed plurality of physical items that are associated with a first time period. In response to receiving the request, the method includes: displaying on the display a respective user interface object for each physical item of the fixed plurality of physical items. A first user interface object for a first physical item includes a visual representation of an aggregate interest level for the first physical item during the first time period as compared to a threshold interest level for the first physical item (e.g., a progress bar like the ones shown in FIG. 8C-8G, 8J, 8L-8O for each respective physical item, showing how close a respective interest level is to reaching a respective threshold interest level for each respective physical item), and the aggregate interest level reflects a quantity of the first physical item requested by the user and at least one other user (i.e., the aggregate interest level reflects a total quantity that an organization, including each of the users purchasing products for that organization, is interested in obtaining). While displaying the respective user interface objects for each physical item of the fixed plurality of physical items, the method includes: receiving an indication (e.g., from a server system, such as print procurement servers 106, FIG. 1) that the threshold interest level for the first physical item has been satisfied. In accordance with receiving the indication, the method includes: updating the first user interface object to indicate that a threshold-specific price has been secured for the first physical item.

(A2) In some embodiments of the method of A1, the fixed plurality of physical items is not editable by the user and the user cannot add physical items to the fixed plurality.

(A3) In some embodiments of the method of any one of A1-A2, the user and the at least one other user are each associated with distinct shipping locations and the aggregate interest level reflects interest levels across one or more shipping locations, the one or more shipping locations including the distinct shipping locations.

(A4) In some embodiments of the method of A3, the one or more shipping locations are locations to which the physical products are to be shipped.

(A5) In some embodiments of the method of A3, the first user interface object for the first physical object includes a respective numerical value that reflects a respective interest level for at least two of the one or more shipping locations.

(A6) In some embodiments of the method of A5, the method further includes: receiving a request to view shipping locations in addition to the at least two of the one or more shipping locations and, in response, updating the first user interface object to include a respective numerical value that reflects a respective interest level for an additional shipping location of the one or more shipping locations.

(A7) In some embodiments of the method of any one of A1-A6, the visual representation includes a progress bar and a textual description as to whether the threshold interest level has been met.

(A8) In some embodiments of the method of any one of A1-A7, the method further includes: while displaying the respective user interface objects for each physical item of the fixed plurality of physical items, receiving an indication that a second user, distinct from the first user, is modifying ordering information for a respective physical item. In response to receiving the indication, the method includes: updating a respective user interface object for the respective physical item to indicate that the second user is modifying ordering information for the respective physical item. In some embodiments or circumstances, this allows users to easily see what interest other users (e.g., those located in disparate geographies) are expressing in particular physical items. Therefore, multinational companies that have disparately located groups now have a single place where ordering details can be consolidated, in order to achieve lower price per unit costs and also achieve consistency in materials utilized for various marketing campaigns.

(A9) In some embodiments of the method of A8, the indication that the threshold interest level for the first physical item has been satisfied is received after the second user modifies the ordering information. For example, the second user indicates enough interest (additional quantity of the first physical item) to push the aggregate interest level above the threshold interest level.

(A10) In some embodiments of the method of any one of A1-A9, the method further includes: detecting a selection of the first user interface object. In response to detecting the selection, the method includes: displaying ordering information that is specific to the first physical object, including displaying a new representation of the current interest level for the first physical object during the first time period as compared to the threshold interest level for the first physical item.

(A11) In some embodiments of the method of any one of A1-A10, the user is associated with a buy group that includes the fixed plurality of physical items.

(A12) In some embodiments of the method of any one of A1-A11, the fixed plurality of physical items is associated with a first buy group that is created by an administrator using a bulk upload process for at least two buy groups, the at least two buy groups including the first buy group. For example, the administrator creates each buy group using Excel (e.g., an Excel sheet such as the one shown on FIG. 10D) and imports them into the print procurement system using the interface shown in FIG. 10C. In some embodiments, catalogs of items for each of the buy groups can also be imported into the system easily using an Excel file (see, e.g., FIG. 10E).

(A13) In some embodiments of the method of any one of A1-A12, the first time period and the fixed plurality of physical items were both selected by an administrator before the electronic device receives the request to view the ordering information. For example, the administrator interacts with the user interface shown on FIG. 10I in order to configure specific details and parameters for the fixed plurality of physical items.

(A14) In some embodiments of the method of A13, a respective threshold interest level for each physical item was also selected by the administrator before receiving the request.

(A15) In some embodiments of the method of A14, the respective threshold interest level is associated with a current supplier-provided sale price for a respective physical item.

(A16) In some embodiments of the method of A14, the fixed plurality of physical items were selected by the administrator using an imported file. In some embodiments, user interface similar to the one shown in FIG. 10C is utilized and the administrator imports a ".xlsx" file that includes details regarding the fixed plurality of physical items (e.g., such as the excel sheet shown in FIG. 10E). In some embodiments, the administrator simply selects an identifier for a particular catalog of times (see, e.g., FIG. 10D.

(A17) In some embodiments of the method of any one of A1-A16, the method further includes: after the first time period has expired, receiving a new request to export ordering information associated with the fixed plurality of physical items in a particular format. In response to receiving the new request, the method includes: providing the ordering information in the particular format. For example, as shown in FIGS. 9A-9D, ordering information for a closed buy group named "Third Buy Group" can be exported for viewing in Excel.

(A18) In some embodiments, a non-transitory computer-readable storage medium stores executable instructions that, when executed by an electronic device that is in communication with a display, cause the electronic device to perform the method described in any one of A1-A17 above.

(A19) In some embodiments, an electronic device with a display, one or more processors, and memory is provided. The memory stores one or more programs which, when executed by the one or more processors, cause the electronic device to perform the method of any one of A1-A17.

(A20) In some embodiments, a graphical user interface on an electronic device with a display is provided. The graphical user interface includes user interfaces displayed, on the display of the electronic device, in accordance with the method described in any one of A1-A17 above.

(A21) In some embodiments, a system that includes one or more processors and memory is provided. The memory of the server system stores one or more programs which, when executed by the one or more processors of the server system, cause the server system to: receive, from an administrator, selections of physical items for inclusion in a fixed plurality of physical items, wherein each physical item of the fixed plurality of physical items is associated with a threshold interest level; monitor, for each physical item of the plurality of physical items, respective aggregate interest levels that reflect a quantity of a respective physical item requested by two or more disparately located users associated with distinct shipping locations; while monitoring the respective aggregate interest levels, detect a change in a first aggregate interest level for a first physical item of the fixed plurality of physical items, wherein the change is initiated by a user of an electronic device that is distinct from the server system; in response to detecting the change in the first aggregate interest level for the first physical item, determine whether the first aggregate interest level satisfies a respective threshold interest level that is associated with the first physical item; and in accordance with a determination that the first aggregate interest level satisfies a respective threshold interest level that is associated with the first physical item, send, to at least the electronic device, an indication that a threshold-specific price for the first physical item has been secured.

(A22) In some embodiments, a non-transitory computer-readable storage medium is provided. The non-transitory computer-readable storage medium stores executable instructions which, when executed by one or more processors of a server system, cause the server system to perform the operations recited in A21.

In some embodiments, the server system of A21 and A22 is also configured to perform server-side operations to enable the client-side operations described in A1-A20 above.

Thus methods, systems, electronic devices, and graphical user interfaces are provided that allow for easy and efficient management of print procurement orders based on item-specific interest levels and supplier-influenced thresholds in a print procurement system.

BRIEF DESCRIPTION OF THE DRAWINGS

So that the present disclosure can be understood in greater detail, a more particular description may be had by reference to the features of various embodiments, some of which are illustrated in the appended drawings. The appended drawings, however, merely illustrate pertinent features of the present disclosure and are therefore not to be considered limiting, for the description may admit to other effective features.

FIG. 7 is a flowchart representation of a method of efficiently managing buy groups in a print procurement system, in accordance with some embodiments.

FIGS. 9A-9D are schematics of a display used to illustrate example user interfaces for viewing information associated with closed buy groups (i.e., buy groups for which an associated time period has expired and, thus, the buy group is now closed), in accordance with some embodiments.

FIGS. 10A-10I are schematics of a display used to illustrate example user interfaces for setting up and configuring a buy group via an administrator's component of a print procurement system, in accordance with some embodiments.

Figure 10A:
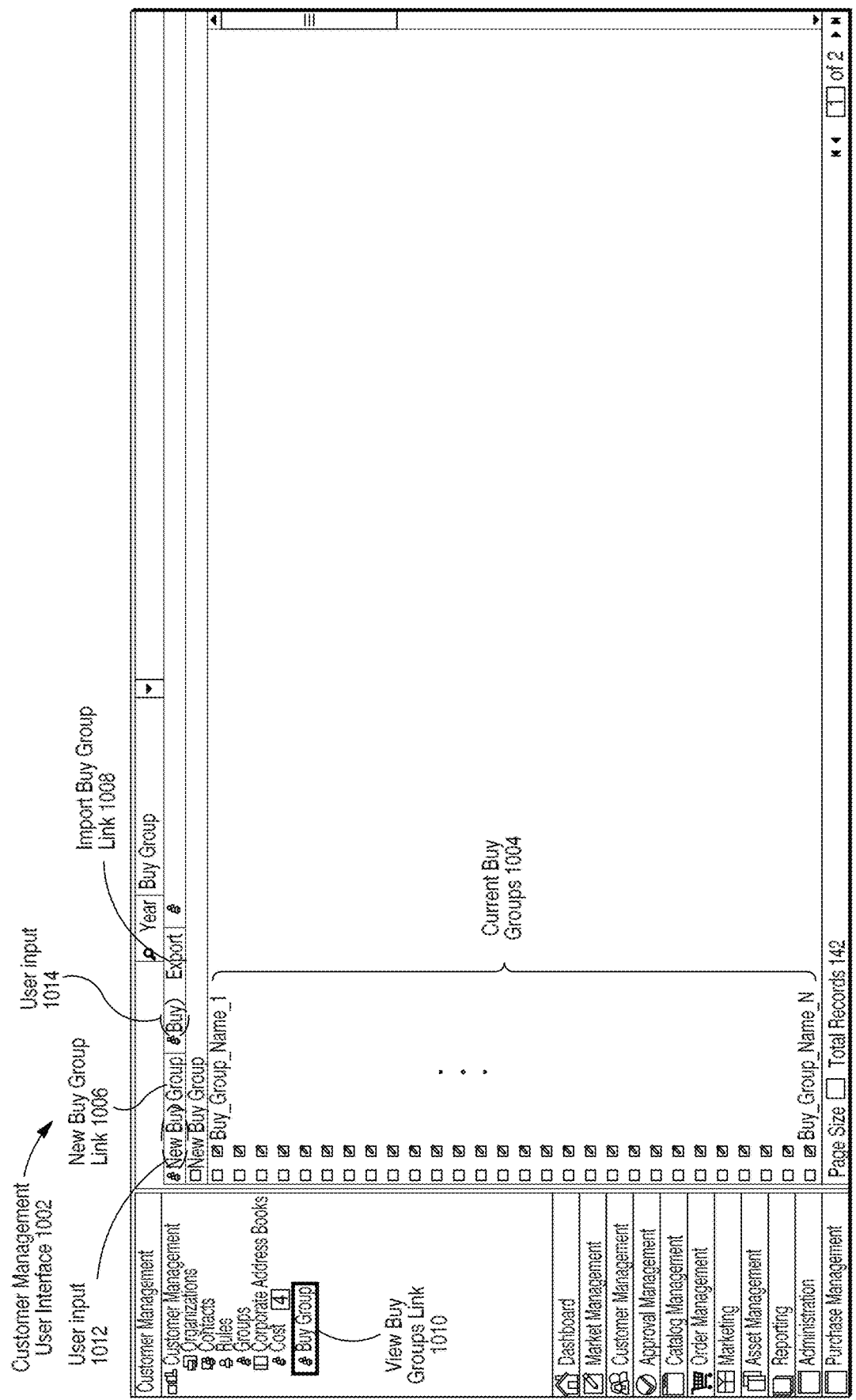
Figure 10B:
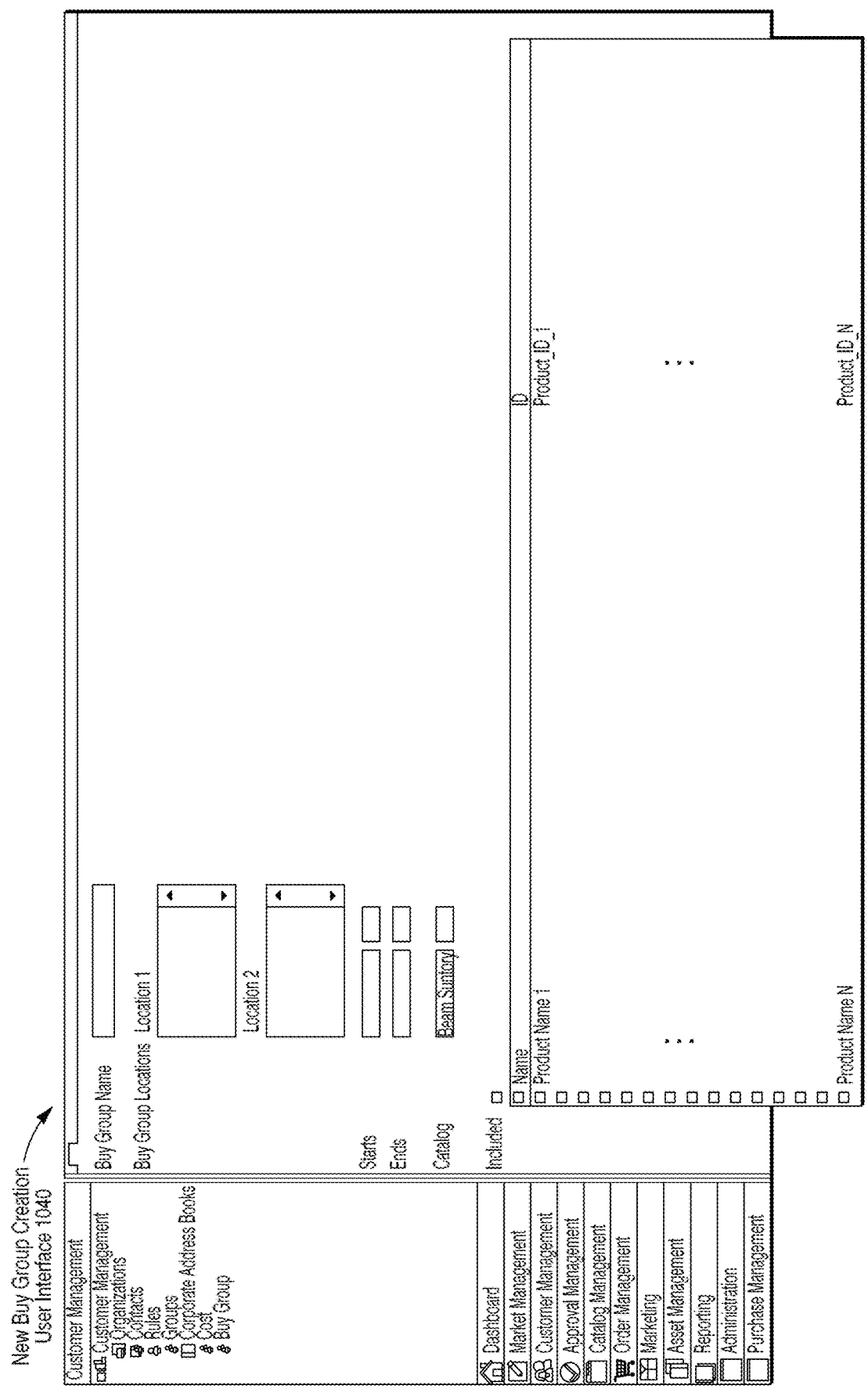
Figure 10F:
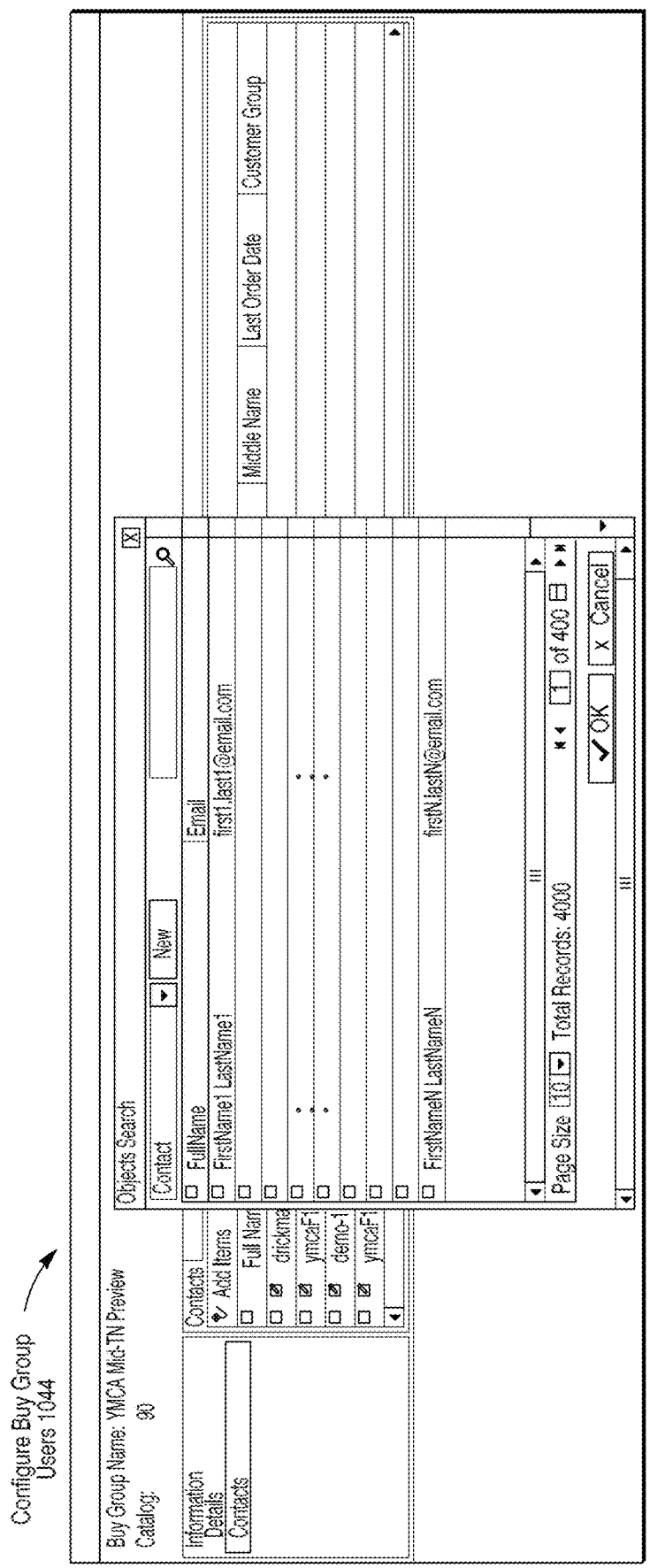
Figure 10G:
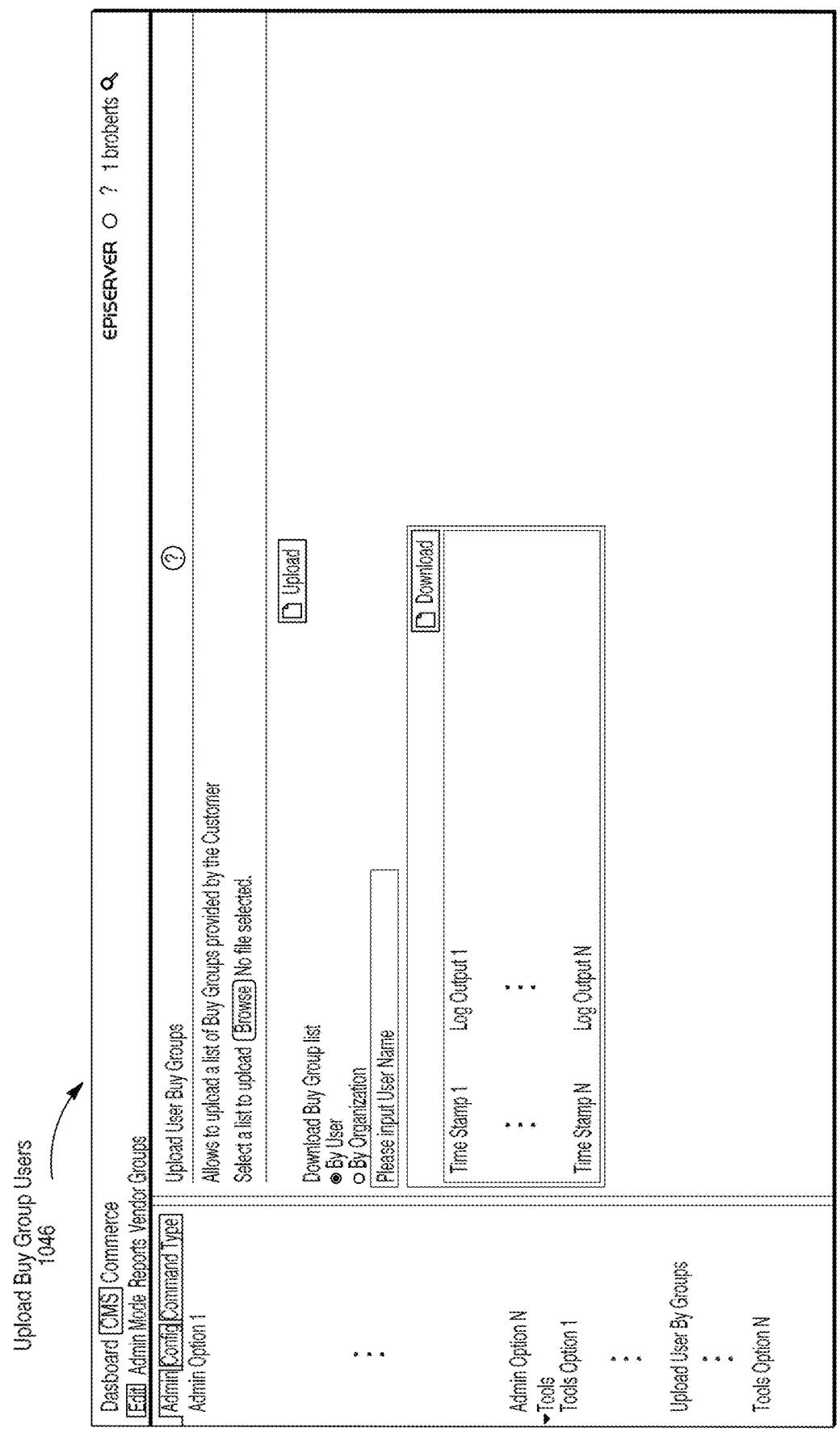
Figure 10I:
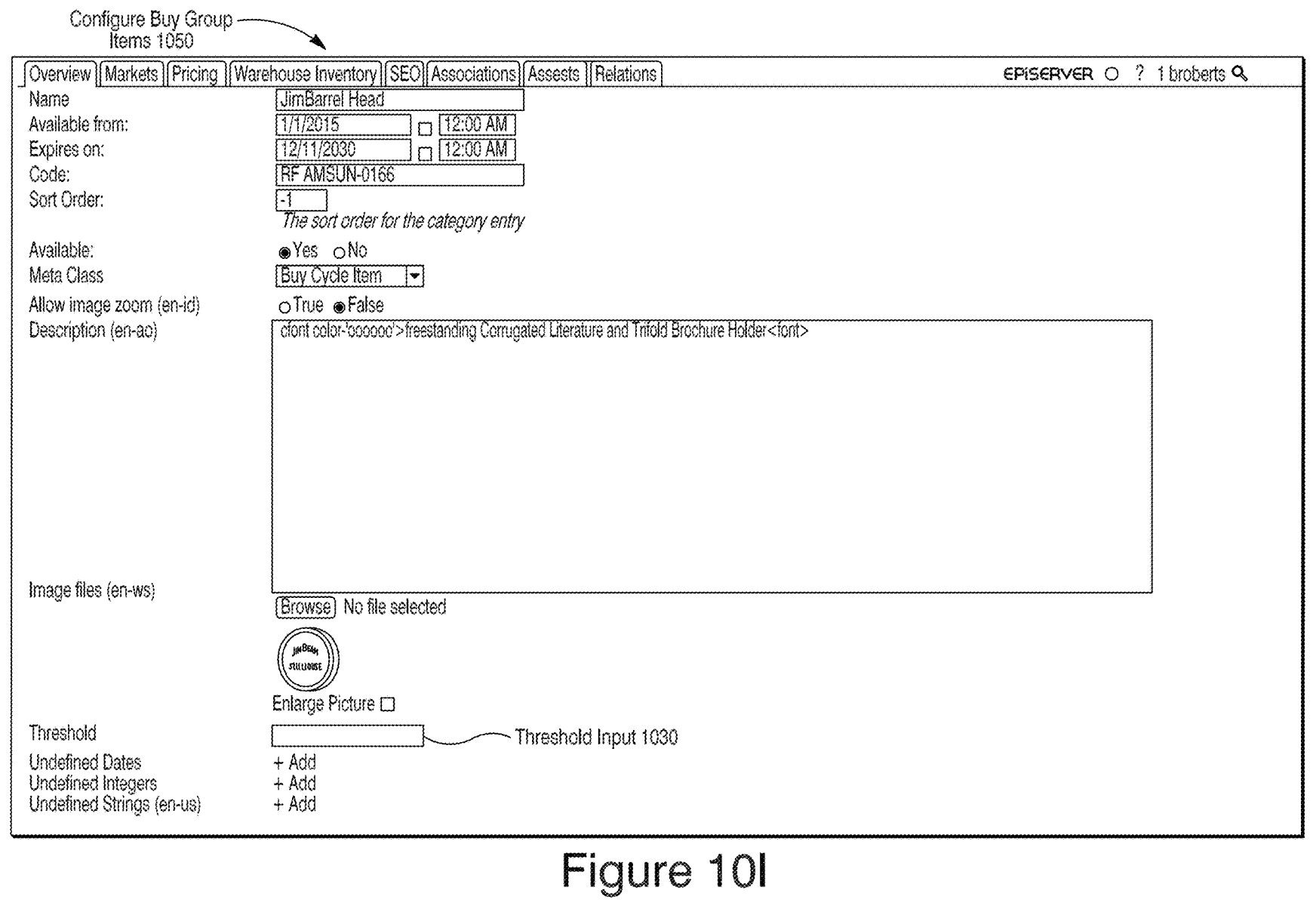
Figure 11:
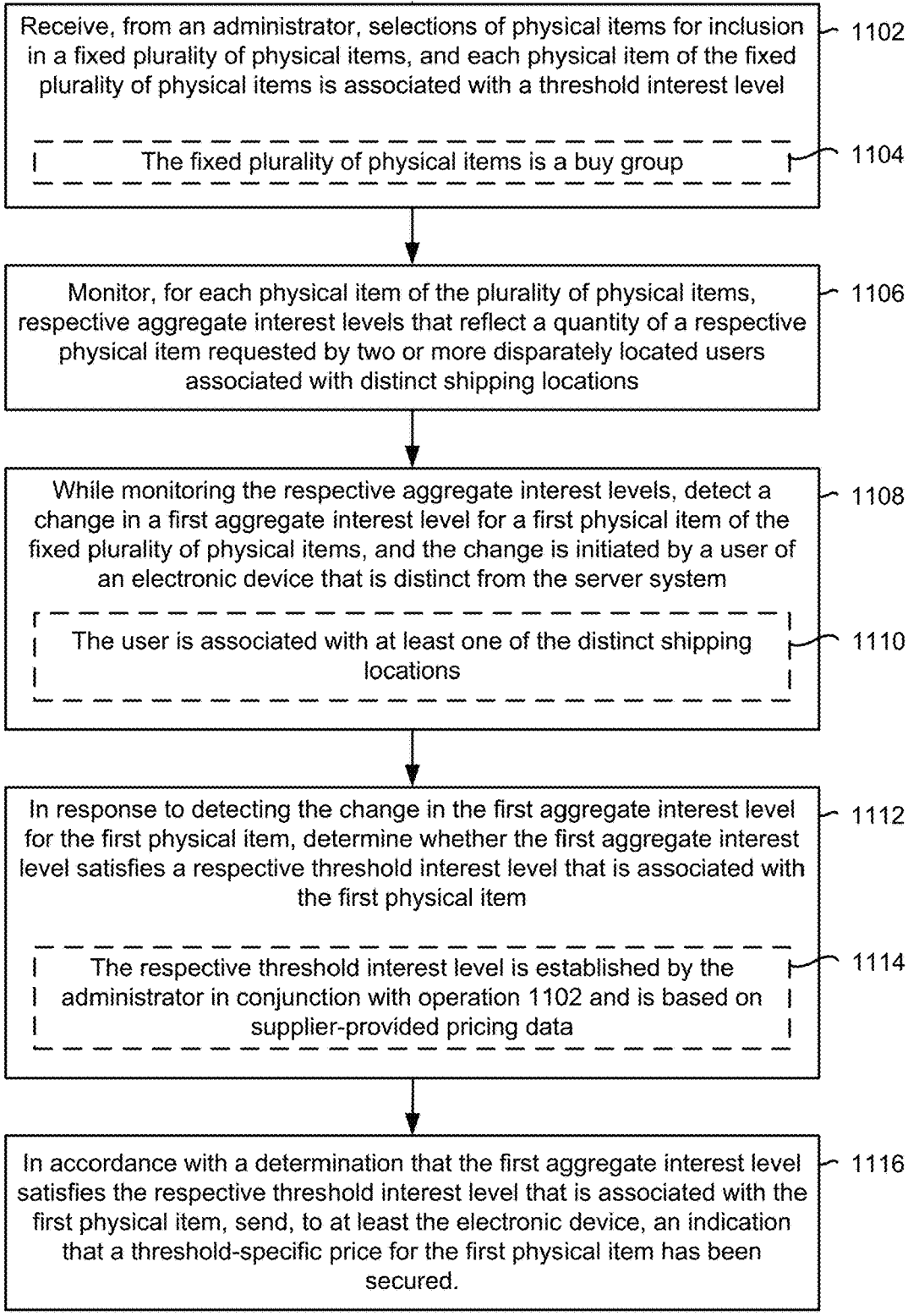
FIG. 11 is a flowchart representation of a method of efficiently managing buy groups in a print procurement system, in accordance with some embodiments.

Some of the user interfaces of FIGS. 8A-8W, 9A-9D, and 10A-10I are used to illustrate and explain the processes or operations of FIGS. 7 and 11. Some embodiments combine, exchange, and/or reorder some of the processes or operations in FIGS. 7 and 11.

In accordance with common practice, the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION OF EMBODIMENTS

Disclosed embodiments make the potentially complex process of generating baseline candidates into a straightforward and intuitive process. Therefore, users are able to use the disclosed embodiments to locate better baseline candidates. This results in better, more meaningful, more detailed, and more accurate print procurement systems, which can be used to make better and more informed business decisions.

Figure 1:
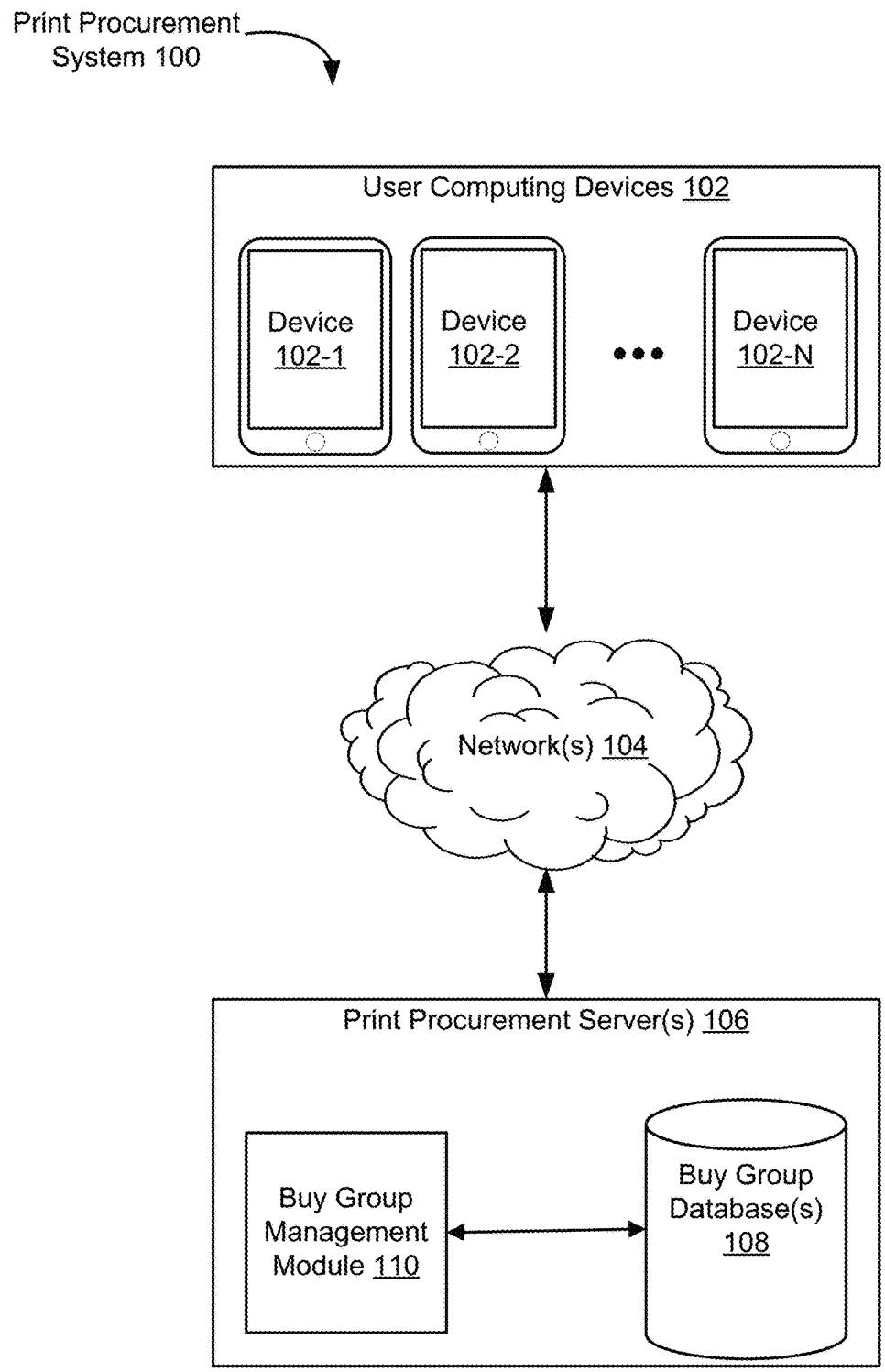
FIG. 1 illustrates an exemplary print procurement system, in accordance with some embodiments.

FIG. 1 illustrates a print procurement system 100 in which some embodiments operate. One or more users each interact with one or more user computing devices 102 (also referred to as computing device 102 and device 102), such as a desktop computer, a laptop computer, a tablet computer, a tablet, a mobile computing device, a mobile phone, or a virtual machine running on such a device. An example computing device 102-1 is described below with respect to FIG. 2, including various software programs or modules that execute on the computing device 102-1. In some embodiments, the computing device 102-1 includes a web browser 220 (FIG. 2) that is capable of executing a print procurement web application 222 (FIG. 2), a print procurement application 224 (FIG. 2), a buy group management module 226, and a buy group data fetching module 228 that the computing device 102-1 (or an application installed thereon such as print procurement application 224) uses to efficiently manage print procurement orders based on item-specific interest levels and supplier-influenced thresholds.

In some embodiments of the print procurement system 100, the user computing devices 102 communicate with the one or more print procurement servers 106 over one or more networks 104. The one or more networks (e.g., network(s) 104) communicably connect each component of the print procurement system 100 with other components of the print procurement system 100. In some embodiments, the one or more networks 104 include public communication networks, private communication networks, or a combination of both public and private communication networks. For example, the one or more networks 104 can be any network (or combination of networks) such as the Internet, other wide area networks (WAN), local area networks (LAN), virtual private networks (VPN), metropolitan area networks (MAN), peer-to-peer networks, and/or ad-hoc connections.

Figure 2:
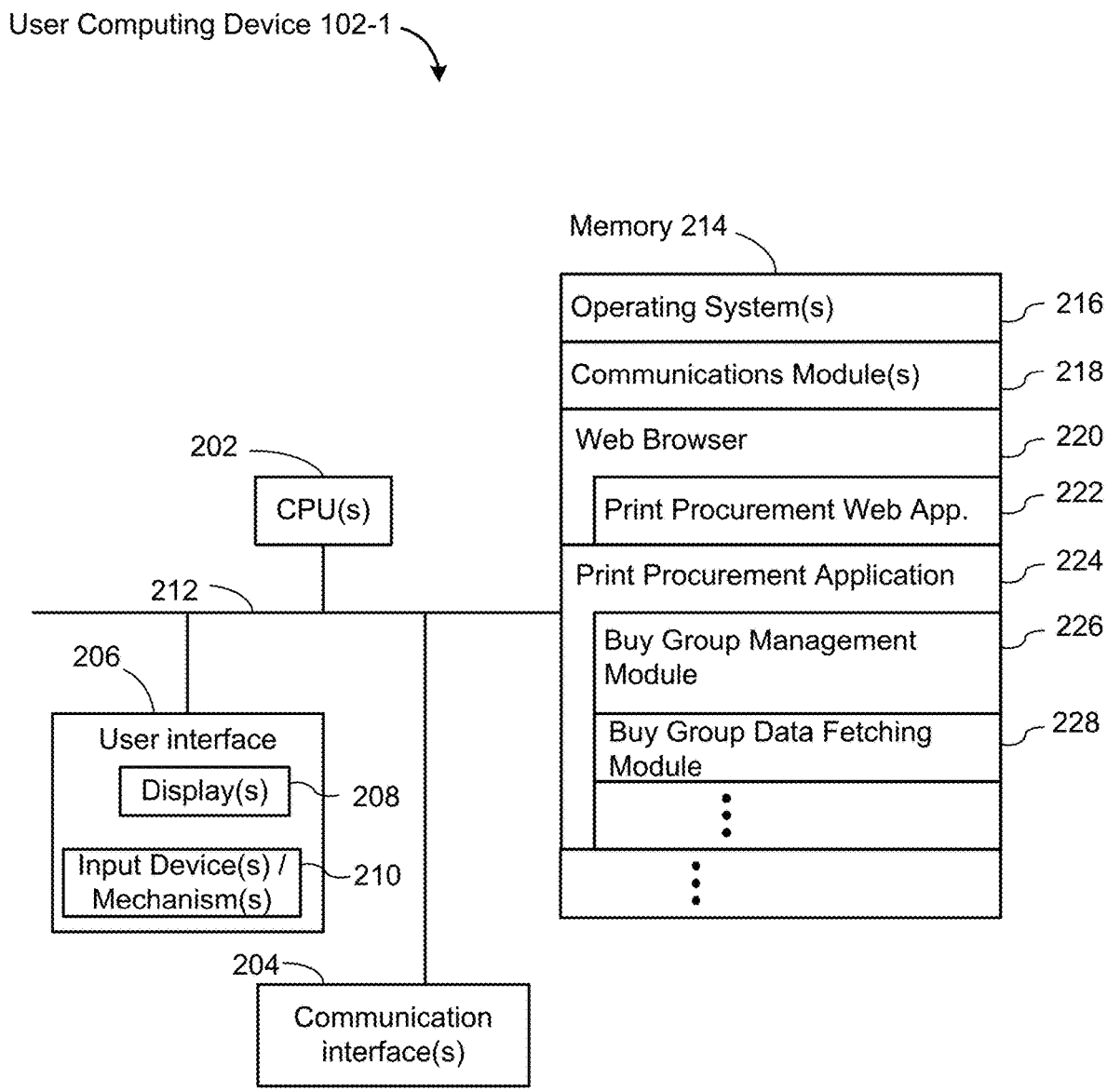
FIG. 2 is a block diagram of a computing device, in accordance with some embodiments.
Figure 3:
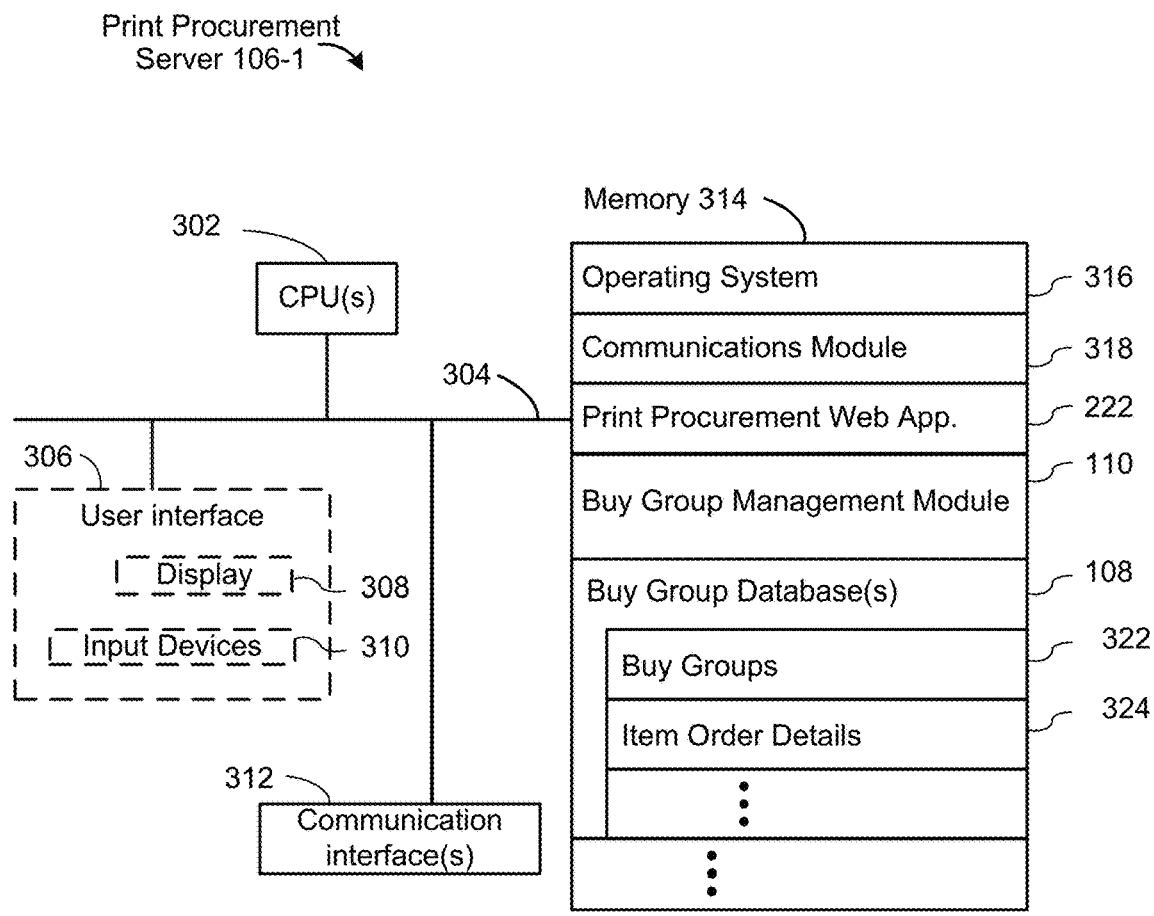
FIG. 3 is a block diagram of a print procurement server, in accordance with some embodiments.

An exemplary print procurement server 106-1 (also referred to herein as a server 106-1) is described in more detail with respect to FIG. 3. As mentioned above, some embodiments provide a print procurement web application 222 (FIG. 2) that runs wholly or partially within a web browser 220 (FIG. 2) on the computing devices 102. In some embodiments, print procurement functionality is provided by both a local print procurement application 224 and certain functions are provided by communicating with the one or more servers 106 over the one or more networks 104. For example, the one or more servers 106 may be used for resource-intensive operations.

In some embodiments, the computing devices 102 connect to one or more remotely located print procurement servers 106 through communication network(s) 104. In this way, some print procurement operations can be performed remotely and computing resources at the computing devices 102 can be preserved for other operations. For example, operations requiring input from a user are performed at the computing devices 102 (e.g., the user interacts with one or more user interfaces provided on the computing devices 102 (such as the user interfaces shown in FIGS. 6A-6B, 8A-8W, and 9A-9D) and information identifying user input and user interactions at the user interfaces are sent to the remotely located print procurement servers 106 for storage and/or further processing).

The one or more print procurement servers 106, in some embodiments, include a buy group management module 110 that monitors respective item-specific interest levels for each physical item in a buy group as compared to a respective threshold interest level for each physical item. For example, as users of various computing devices 102 (e.g., each user is a buyer for a larger multinational organization with offices all over the world) indicate that they are interested in a particular physical item, their interests can be communicated to the one or more print procurement servers 106 through the communication network(s) 104 for processing by the buy group management module 110 (i.e., for identifying whether an aggregate interest level for that particular physical item has now exceeded a threshold interest level for that particular physical item). In some embodiments or circumstances, sending and processing data at the one or more print procurement servers 106 preserves computing resources at the computing devices 102 (i.e., because the servers 106 perform the data-intensive operations, such as scanning through large volumes of information in order to properly process and compare aggregate interest levels to established threshold, computing resources at the computing devices 102 are preserved for rendering user interfaces and for sending/receiving data to/from the servers 106).

In some embodiments, an allocation of operations between the computing devices 102 and the servers 106 is determined in accordance with bandwidth limitations at the computing devices 102. For example, by monitoring a history of bandwidth usage against available bandwidth at a respective computing device 102, a baseline measurement for bandwidth requirements at the respective computing device 102 can be established (e.g., if after observing/monitoring bandwidth usage for a predefined period of time (e.g., 2 days), bandwidth usage averages 100 MB per hour, then 100 MB hour can be established as the baseline). By establishing the baseline measurements for bandwidth usage, a determination can then be made to determine whether to perform a data-intensive operation at the computing device 102 or at one of the servers 106. For example, in accordance with a determination that a first operation requires more than a predefined percentage (e.g., 10%, 20%, or 30%) of the baseline bandwidth, then the first operation should be performed at one of the servers 106 and not at the computing device 102. In some embodiments, the baseline bandwidth is a baseline measured against bandwidth usage over 20 minutes, 45 minutes, 1.5 hours, 6 hours, or the like.

In some embodiments, the determination as to which device should perform a particular operation is based on where data required by the particular operation is stored. For example, if the particular operation requires data that is stored in a respective buy group database 108 (FIG. 1), then the particular operation can be performed more efficiently at one of the servers 106, because the required data can be queried/retrieved/processed locally and without having to sending that data back and forth using the networks 104, in order to communicate that data to one of the computing devices 102. In some embodiments, a portion of the data that may be stored at the buy group databases 108 can also be cached by a respective computing device 102 and the respective computing device 102 can perform processing operations using the cached data and need only communicate with a respective server 106 in order to obtain additional data (i.e., data that was not cached).

In some embodiments, information about buy groups (e.g., buy group names, users associated with each buy group, time periods during which buy groups are active, physical item IDs for each buy group, and associated shipping locations for each buy group, and the like) and item order details for each physical item within the buy groups (e.g., item IDs, buy group IDs, thresholds for securing targeted sales prices, current interest levels across a plurality of shipping locations, and last edited information for each physical item in each buy group) is/are all stored in the one or more buy group databases 108 for easy access and storage.

In some embodiments, the print procurement system 100 is provided by a print procurement service provider. The print procurement service provider connects entities requiring print jobs to create/purchase printed materials (e.g., banners, posters, business cards, etc.) with suppliers capable of fulfilling the print jobs. In some embodiments, print jobs each include one or more items (i.e., items of printed material). In some embodiments, the entities requiring the print jobs rely on the print procurement service provider to locate suppliers on their behalf. Typically, the print procurement service provider assigns a print procurement manager ("PPM") to the entity and the PPM is responsible for interacting with the print procurement system 100 (e.g., through the print procurement web application or print procurement application) to locate appropriate suppliers. In some embodiments, the entities requiring print jobs are referred to herein as clients of the print procurement system or as clients of the print procurement service provider. In some embodiments, a PPM or some other representative of the client interacts with the print procurement application or the print procurement web application. In some embodiments, each entity represents a single shipping location (e.g., a branch of a large organization) and, thus, a number of PPMs are associated with the large organization as a whole, even though each entity is only associated with one or two PPMs responsible for helping to manage print procurement orders for that entity.

FIG. 2 is a block diagram illustrating one of the computing devices 102 (e.g., computing device 102-1) that a user uses to interact with a locally installed print procurement application (e.g., print procurement application 224) and/or to interact with a print procurement web application (e.g., print procurement web application 222) using a web browser (e.g., web browser 220), in accordance with some embodiments. A computing device 102-1 typically includes one or more processing units/cores (CPUs/GPUs) 202 for executing modules, programs, and/or instructions stored in the memory 214 and thereby performing processing operations; one or more network or other communications interfaces 204; the memory 214; and one or more communication buses 212 for interconnecting these components. The communication buses 212 may include circuitry that interconnects and controls communications between system components.

The computing device 102-1 also includes a user interface 206 that includes a display device 208 and one or more input devices or mechanisms 210. In some embodiments, the input device/mechanism 210 includes a keyboard; in some embodiments, the input device/mechanism includes a "soft" keyboard, which is displayed as needed (e.g., in response to a user tapping a user input element that requires input from a keyboard, the soft keyboard is displayed) on the display device 208, enabling a user to "press keys" that appear on the display 208. In some embodiments, the display 208 and input device/mechanism 210 comprise a touch-screen display (also called a touch-sensitive display). In other embodiments, the display 208 and input device/mechanism 210 comprise a separate monitor and a separate keyboard that are in communication with the computing device 102-1.

In some embodiments, the computing device 102-1 has memory 214 that includes high-speed random access memory, such as DRAM, SRAM, DDR RAM, or other random access solid state memory devices. In some embodiments, the memory 214 includes non-volatile memory, such as one or more magnetic disk storage devices, optical disk storage devices, flash memory devices, or other non-volatile solid-state storage devices. Optionally, the memory 214 includes one or more storage devices remotely located from the CPU(s)/GPUs 202. The memory 214, or alternately the non-volatile memory device(s) within the memory 214, comprises a non-transitory computer-readable storage medium. In some embodiments, the memory 214, or the non-transitory computer-readable storage medium of the memory 214, stores the following programs, modules, and data structures, or a subset thereof:

- an operating system 216, which includes procedures for handling various basic system services and for performing hardware-dependent tasks;
- a communications module 218, which is used for connecting the computing device 102-1 to computers and devices via the one or more communication interfaces 204 (wired or wireless) and one or more communication networks 104 (FIG. 1), such as the Internet, other wide area networks, local area networks, metropolitan area networks, and so on;
- a web browser 220 (or other client-side application capable of displaying web pages), which enables a user to communicate over a network with remote computers, servers, and/or devices. In some embodiments, the web browser 220 executes a print procurement web application 222 provided by one or more print procurement servers 106 (e.g., by receiving information from the server 104 as needed to fulfill requests to view information). In some embodiments, a print procurement web application 222 is in alternative to (or in addition to) storing a print procurement application 224 locally on the computing device 102-1;
- a print procurement application 224, which enables users to interact with a print procurement system 100 (FIG. 1) such as by navigating through web pages, inputting data into web pages, and the like. In some embodiments, the print procurement application 224 retrieves information from one or more buy group databases 108 (FIG. 1) that are stored on one or more print procurement server(s), then generates and displays the retrieved information in user interfaces that allow the users to, for example, update interest levels associated with physical items that are in a particular buy group and view information related to whether a current aggregate interest level for a respective physical item has satisfied a threshold interest level that is associated with the respective physical item (e.g., some example user interfaces are shown in FIGS. 6A-6B and 8A-8W). In some instances, the print procurement application 224 invokes other modules (either on the computing device 102-1 or at one or more print procurement servers 106), as described in more detail below. The print procurement application 224 also includes one or more of the following additional modules, or a subset or superset thereof:
  - a buy group management module 226 for managing item-specific/aggregate interest levels and threshold interest levels for each physical item in a fixed plurality/buy group of physical items; and/or
  - a buy group data fetching module 228 for retrieving information from databases that are locally stored on the device 102-1 or that are remotely located from the device 102-1 (e.g., from one or more buy group databases 108 on one or more print procurements servers 106).

Each of the above identified executable modules, applications, or sets of procedures may be stored in one or more of the previously mentioned memory devices, and corresponds to a set of instructions for performing a function described above. The above-identified modules or programs (i.e., sets of instructions) need not be implemented as separate software programs, procedures, or modules, and thus various subsets of these modules may be combined or otherwise rearranged in various embodiments. In some embodiments, the memory 214 may store a subset of the modules and data structures identified above. Furthermore, the memory 214 may store additional modules or data structures not described above. In some embodiments, the programs, modules, and data structures stored in the memory 214, or the non-transitory computer-readable storage medium of the memory 214, provide instructions for implementing some of the methods described below.

Although FIG. 2 shows a computing device 102-1 in accordance with some embodiments, FIG. 2 is intended more as a functional description of the various features that may be present rather than as a structural schematic of the embodiments described herein. In practice, and as recognized by those of ordinary skill in the art, items shown separately could be combined and some items could be separated.

FIG. 3 is a block diagram illustrating a print procurement server 106-1 (e.g., one or more print procurement servers 106, FIG. 1), in accordance with some embodiments. The print procurement server 106-1 may host one or more buy group databases 108 and may provide various executable applications or modules. A server 106-1 typically includes one or more processing units (CPUs/GPUs) 302, one or more network interfaces 304, a memory 314, and one or more communication interface(s) 312 for interconnecting these components. In some embodiments, the server 106-1 optionally includes a user interface 306, which includes a display device 308 and one or more input devices 310, such as a keyboard and a mouse. In some embodiments, the server 106-1 is in communication with the user interface 306 (e.g., the display device 308 is a separate monitor that is coupled with the server 106-1).

The memory 314 includes high-speed random access memory, such as DRAM, SRAM, DDR RAM, or other random access solid state memory devices, and may include non-volatile memory, such as one or more magnetic disk storage devices, optical disk storage devices, flash memory devices, or other non-volatile solid state storage devices. In some embodiments, the memory 314 includes one or more storage devices remotely located from the CPU(s)/GPUs 302. The memory 314, or alternately the non-volatile memory device(s) within the memory 314, includes a non-transitory computer-readable storage medium. In some embodiments, the memory 314 or the non-transitory computer-readable storage medium of the memory 314 stores the following programs, modules, and data structures, or a subset thereof:
- an operating system 316, which includes procedures for handling various basic system services and for performing hardware dependent tasks;
- a network communications module 318, which is used for connecting the server 106-1 to other computers via the one or more communication interfaces 304 (wired or wireless) and one or more communication networks 104 (FIG. 1), such as the Internet, other wide area networks, local area networks, metropolitan area networks, and so on;
- a print procurement web application 222 (or information about the print procurement application), which may be downloaded and executed by a web browser 220 (FIG. 2) on a user's computing device 102. In some embodiments, the print procurement web application 222 allows the server 106-1 to serve information related to the print procurement system 100 to one or more user computing devices 102 (FIG. 1);
- a buy group management module 110 for managing item-specific/aggregate interest levels and threshold interest levels for each physical item in a fixed plurality/buy group of physical items;
- one or more buy group databases 108 for storing information about physical items (e.g., expressed interest levels relative to established threshold for each physical item) associated with buy groups. In some embodiments, the one or more print job databases 108 include one or more of the following additional modules, or a subset or superset thereof:
    - information about buy groups 322, such as users associated with each buy group, time periods during which the buy groups are active (and, after which, the buy groups expire such that no users can express interest in a physical item in an expired buy group), IDs identifying physical items that are associated with the buy groups, and IDs identifying shipping locations that are associated with the buy groups (e.g., locations to which the physical items are to be shipping), and the like, and as discussed in more detail below in reference to FIGS. 4A-4B; and
    - information about item order details 324 associated with each physical item in the buy groups, as discussed in more detail below in reference to FIGS. 5A-5B.

Each of the above-identified executable modules, applications, or sets of procedures may be stored in one or more of the previously mentioned memory devices, and corresponds to a set of instructions for performing a function described above. The above-identified modules or programs (i.e., sets of instructions) need not be implemented as separate software programs, procedures, or modules, and thus various subsets of these modules may be combined or otherwise rearranged in various embodiments. In some embodiments, the memory 314 may store a subset of the modules and data structures identified above. Furthermore, the memory 314 may store additional modules or data structures not described above. In some embodiments, the programs, modules, and data structures stored in the memory 314, or the non-transitory computer-readable storage medium of the memory 314, provide instructions for implementing some of the methods described below.

In some embodiments, the server 106-1 and the components thereon (e.g., buy group databases 108) are implemented using a customized version of MICROSOFT Dynamics AX on the back-end of the system.

Although FIG. 3 shows a server 106-1 in accordance with some embodiments, FIG. 3 is intended more as a functional description of the various features that may be present rather than as a structural schematic of the embodiments described herein. In practice, and as recognized by those of ordinary skill in the art, items shown separately could be combined and some items could be separated. In addition, some of the programs, functions, procedures, or data shown above with respect to a server 106-1 may be stored on a computing device 102-1. In some embodiments, the functionality and/or data may be allocated between one or more computing devices 102 and one or more servers 106 (as explained in more detail above in reference to FIG. 1). Furthermore, one of skill in the art recognizes that FIG. 3 need not represent a single physical device. In many embodiments, the server functionality is allocated across multiple physical devices that comprise a server system. As used herein, references to a "server" or "print procurement server" include various groups, collections, or arrays of servers that provide the described functionality, and the physical servers need not be physically collocated (e.g., the individual physical devices could be spread throughout the United States or throughout the world).

Figures 4A, 4B:
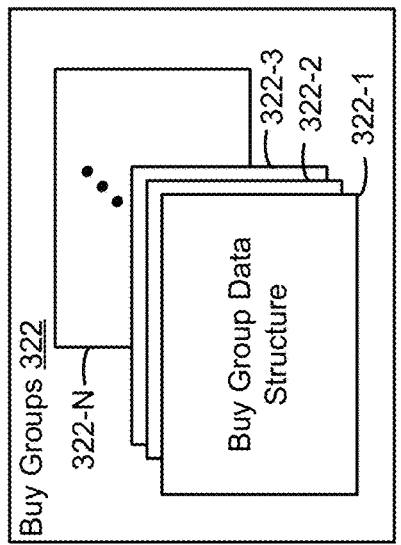
FIGS. 4A-4B are block diagrams illustrating data structures for storing information about fixed pluralities of physical items (also referred to herein as "buy groups"), in accordance with some embodiments.

FIGS. 4A-4B are block diagrams illustrating data structures for storing information about buy groups, in accordance with some embodiments. As shown in FIG. 4A, buy groups 322 (e.g., those that are included in the databases 108, FIG. 3) include a collection of data structures 322, optionally implemented as a collection of tables for each particular client of a print procurement system 100, that each store information about buy groups associated with the particular client of the print procurement system 100 (e.g., print job data structure 322-1 stores information about buy groups for client 1 of the print procurement system 100 and print job data structure 322-2 stores information about buy groups for client 2 of the print procurement system 100). In some embodiments, each table (e.g., table 322-1, 322-2, 322-3 ... 322-N) in the collection of print job data structures stores information about buy groups for more than one client (e.g., print job data structure 322-1 stores information about buy groups for client 1 and for client 3, because clients 1 and 3 often configure similar buy groups, making storage in a single table an efficient and memory-saving option).

In some embodiments, determining whether to store information about buy groups for more than one client or for a single client in a respective table 322 is determined when a new client begins using the print procurement system. For example, the print procurement system scans through the buy group data structures 322 in order to determine whether any related corporate entities, associated with the new client, are already enrolled and using the print procurement system. In accordance with a determination that a related corporate entity, associated with the new client, is using the print procurement system, then a respective print job data structure 322 associated with the related corporate entity is initialized/formatted to store information about buy groups associated with the new client in addition to the related corporate entity. In some embodiments, the new client, while enrolling to use the print procurement system, provides information about related corporate entities and this information is used to efficiently scan through the buy group data structures 322 (e.g., the scan only looks for information about related corporate entities matching those provided by the new client).

In some embodiments, the clients are customers of the print procurement service provider (discussed above in reference to FIG. 1). In some embodiments, the clients are each assigned to one or more print procurement managers ("PPMs") responsible for interacting with the print procurement system and locating suppliers to fulfill print jobs on behalf of their assigned clients.

In some embodiments, one or more buy group data structures 322 (e.g., buy group data structure 322-1, FIG. 4B) are used for storing information about buy groups associated with a particular client of the print procurement system 100. As illustrated in FIG. 4B, buy group data structure 322-1 contains data (e.g., buy group ID, buy group name, associated user IDs, time period, associated item IDs, and associated shipping location IDs) associated with buy groups for client 1. In some embodiments, the data is stored in individual records 410-1, 410-2, 410-3, through 410-N. In some embodiments, a header field 410-0 is used to describe each field of information associated with each of the respective records. Header 410-0, in some embodiments, contains a brief description of each field of information (e.g., each field associated with each of the records) stored within the table. As shown in FIG. 4B, header 410-0 indicates that each record 410-1, 410-2, 410-3, through 410-N stores the following information and data structures, or a subset or superset thereof:

- a value for an "buy group ID" field that uniquely identifies each buy group;
- a value for a "buy group name" field that includes a description of a respective buy group that was provided by a user (e.g., an administrative user) during creation of the respective buy group. In some embodiments, the buy group name is provided by the administrative user during creation of the respective buy group (e.g., while interactive with the user interface shown in FIG. 10I to input details related to the respective buy group);
- a value for an "associated user IDs" field that corresponds to a list or set of user identifiers, each user identifier identifying a user that is associated with the respective buy group (e.g., each of the users is authorized by the administrative user during creation of the respective buy group to update/edit interest levels for each physical item in the buy group for one or more shipping locations, such as, e.g., by editing data included in the quantity fields for each of the shipping locations shown in FIG. 8C);
- a value for "time period" field that corresponds to a start date and an end data defining a period of time during which the buy group remains active (in other words, during this period of time the authorized users are able to continue editing quantity information for each physical item in the buy group, but they can no longer edit this information after the period of time has expired);
- a value for an "associated item IDs" field that corresponds to a list or set of identifiers for physical items that are each associated with the respective buy group; and
- a value for an "associated [shipping] location IDs" field that corresponds to a list or set of identifiers for one or more shipping locations that are each associated with the respective buy group (in other words, these are shipping locations to which physical products will be shipped after expiration of the time period associated with the respective buy group, provided an aggregate interest level for a respective physical item satisfied a threshold interest level for that respective physical item); and/or
- In some embodiments, an optional value for a "print specifications" field that includes a set of information provided by the client (or by a PPM working on behalf of the client) that describes the print requirements for a particular physical item in the respective buy group. In some embodiments, the set of information in the print specifications field includes values for each of the following print specifications: quantity, finished size, flat size, paper weight, paper type, print colors, coating information, basic finishing information, complex finishing information, packing information, delivery information, proofing information, substrate selection information, ink information, and kitting information. In other embodiments, the set of information in the print specifications field includes values for only one or more of the aforementioned print specifications.

In some embodiments, buy group data structure 322-1 includes fields in addition to the fields described above, such as a timestamp field that identifies when a respective buy group was created and/or stored in the table 322-1 and/or a related field that includes one or more buy group ID values that correspond to buy group that are associated with a similar grouping of physical items.

As shown in FIG. 4B, the buy group data structure 322-1 includes records 410-1, 410-2, 410-3 through 410-N. As one example of the information stored in an example record in the buy group data structure 322-1, record 410-1 stores a value of "1" in the buy group ID field, a value of "September Promo Items" in the buy group name field, a value of "{user1, user2, user3}" in the associated user IDs field, a value of "09/09/15-03/04/16" in the time period field, a value of "{1, 4, 7, 11}" in the associated item IDs field, and a value of "{3, 4, 5}" in the associated location IDs field.

Although illustrated as a particular implementation of a data structure (e.g., a table), the data structures of FIGS. 4A-4B, in some embodiments, are implemented in XML files, tables within a relational database, a document-oriented database, text files, and/or any other suitable format for storing data. In some embodiments, the exact entries in each of these fields that are stored in a back-end data structure may differ from the entries shown in FIGS. 4A-4B (e.g., the dates for the time period field may be stored differently).

Figures 5A, 5B:
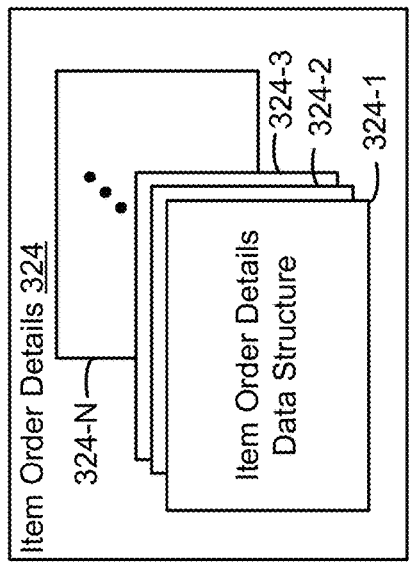
FIGS. 5A-5B are block diagrams illustrating data structures for storing item order details for particular buy groups, in accordance with some embodiments.

FIGS. 5A-5B are block diagrams illustrating data structures for storing information about item order details for physical items (e.g., quantities requested by various users that are associated with distinct shipping locations) that are associated with buy groups, in accordance with some embodiments. As shown in FIG. 5A, item order details data structures 324 include a collection of data structures 324, optionally implemented as a collection of tables for each particular client of the print procurement system 100, that each store item order details associated with one or more buy groups for a particular client of the print procurement system 100 (e.g., item order details data structure 324-1 stores item order details for client 1's buy groups and item order details data structure 324-2 stores item order details for client 2's buy groups). In some embodiments, each table (e.g., table 324-1, 324-2, 324-3 . . . 324-N) in the collection of item order details data structures stores item order details for buy groups associated with more than one client of the print procurement system.

In some embodiments, one or more item order details data structures 324 (e.g., item order details data structure 324-1, FIG. 5B) is/are used for storing item order details associated with one or more buy groups for a client of the print procurement system 100. As illustrated in FIG. 5B, item order details data structure 324-1 contains data (e.g., item ID, buy group ID, threshold interest, current interest levels, and last edited by) associated with each physical item in a particular buy group. In some embodiments, the data is used to monitor current interest levels as compared to a threshold interest, in order to facilitate easy ordering across remotely located shipping locations and users, and also to help ensure that a lowest possible price can be obtained by encouraging some users to express interest in a physical item if a current interest level for the physical item is close to cross its associated threshold interest level (e.g., as discussed below in reference to FIGS. 8A-8W, user interfaces are presented to dynamically update current interest levels, thus encouraging some users to indicate an interest (or express additional interest) as the current interest level changes). In some embodiments, the data is stored in individual records 510-1, 510-2 through 510-N. In some embodiments, a header field 510-0 is used to describe each field of information associated with each of the respective records. Header 510-0, in some embodiments, contains a brief description of each field of information (e.g., each field associated with each of the records) stored within the table. As shown in FIG. 5B, header 510-0 indicates that each record 510-1, 510-2 through 510-N stores the following information and data structures, or a subset or superset thereof:

a value for an "item ID" field that uniquely identifies each physical item;

a value for a "buy group ID" field that identifies a buy group to which a physical item is associated (e.g., corresponding to buy group IDs stored in a respective buy group data structure 322, such as buy group data structure 322-1 shown in FIGS. 4A-4B). In some embodiments, each buy group is associated with one or more physical items and, thus, multiple records within a respective item order details data structure 324 are associated with a particular buy group (i.e., one record for each physical item within a respective buy group);

a value for "threshold interest [level]" field that specifies an interest level (e.g., quantity) in a particular physical item that must be expressed within a particular buy group before a price that is associated with that threshold interest level is secured. For example, if a supplier has a time-sensitive price structure in which a discounted price of $10/item can be secured provided that 1000 items are ordered, then an administrator that is creating a particular buy group (e.g., using the user interface shown in FIG. 10I) might set the threshold level for this item at 1000;

a value for a "current interest levels" field that specifies a set of interest levels in a particular item for each shipping location that is associated with a buy group. In some embodiments, the value may also indicate an identifier for a user that expressed the interest level for each shipping location (e.g., in addition to "location1: 100," the value might also include user8 to indicate that user8 indicated that location1 is interested in a quantity of 100); and a value for a "last edited by" field that specifies an identifier for a user that last updated information for a particular physical item (e.g., a user that last modified a current level of interest).

In some embodiments, item order details data structure 324-1 includes fields in addition to the fields described above, such as a "created by" field that includes information identifying an administrator that added a particular physical item to a buy group (thus creating a new record in the data structure 324-1) and/or a supplier assigned field that indicates whether a particular physical item has been assigned/associated with a capable supplier (i.e., a supplier with appropriate printing equipment to produce the physical item in accordance with provided print specifications that are associated with the physical item).

As shown in FIG. 5B, the item order details data structure 324-1 includes records 510-1, 510-2 through 510-N. As one example of the information stored in an example record in the item order details data structure 324-1, record 510-1 stores a value of "1" in the item ID field, a value of "1" in the buy group ID field, a value of "300" in the threshold interest [level] field, a value of "{location1:100, location2: 100, location3:100}" in the current interest levels field, and a value of "user1" in the last edited by field.

Although illustrated as a particular implementation of a data structure (e.g., a table), the data structures of FIGS. 5A-5B, in some embodiments, are implemented in XML files, tables within a relational database, text files, and/or any other suitable format for storing data.

Figure 6A:
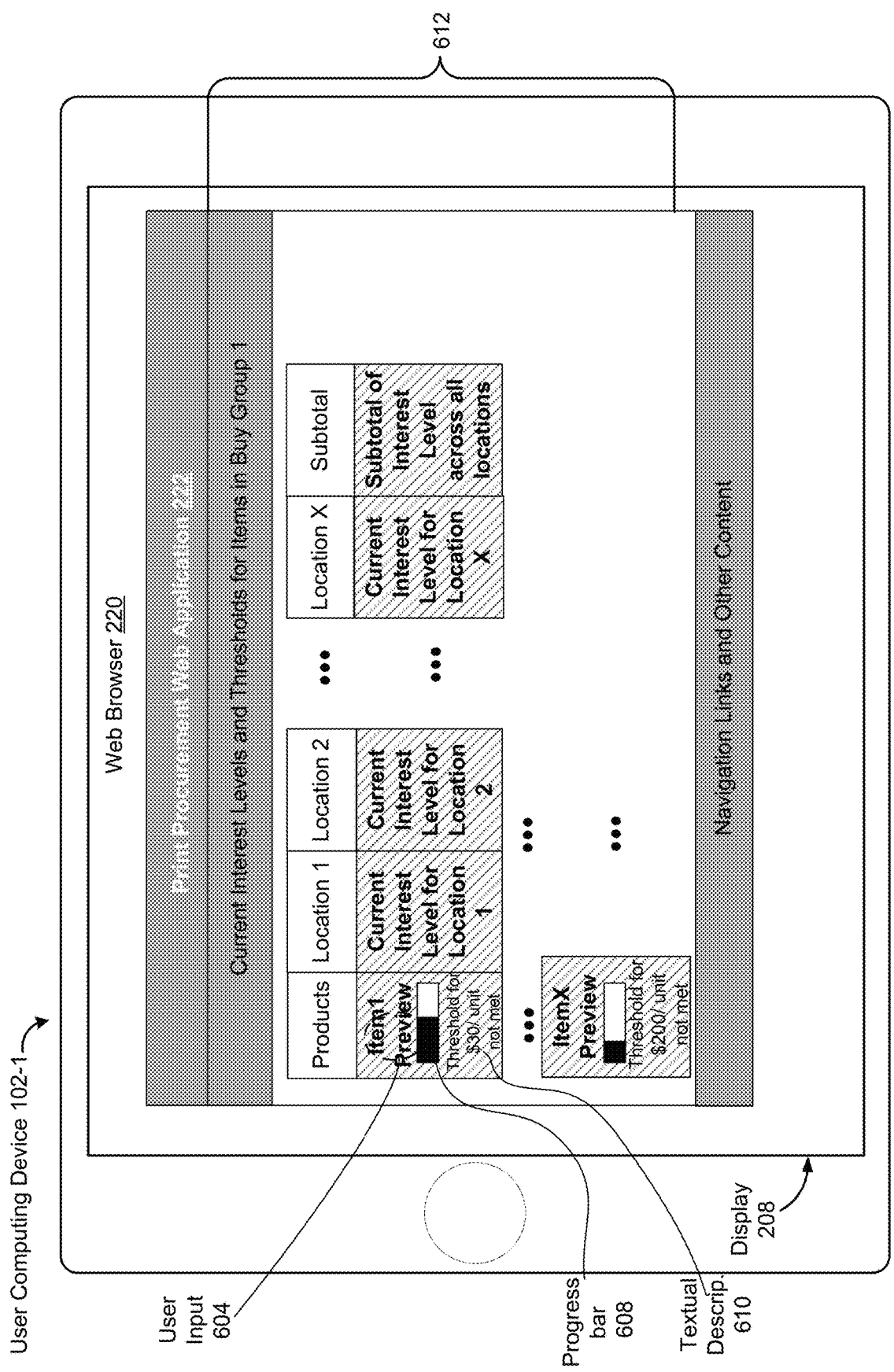
FIGS. 6A-6B are schematics of a display showing example user interfaces for displaying and interacting with information about buy groups, in accordance with some embodiments.
Figure 6B:
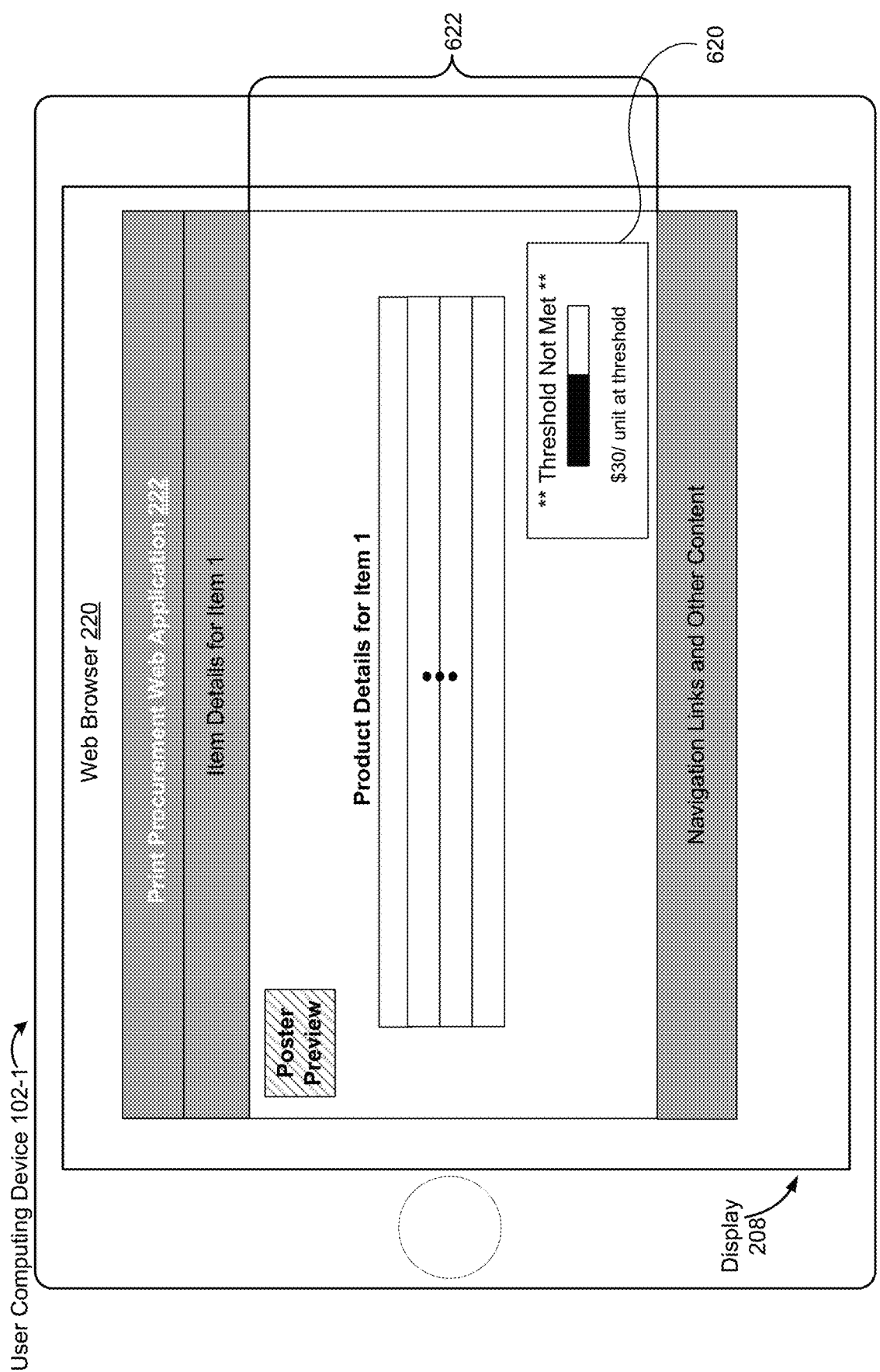

Turning now to FIGS. 6A-6B, schematics of a display are shown and are used to illustrate user interfaces for displaying and interacting with information about buy groups (e.g., respective item-specific interest levels as compared to respective threshold interest levels), in accordance with some embodiments. For ease of reference, the user interfaces discussed below are described as displayed within a web browser but, in other embodiments, the user interfaces may be displayed within a locally-installed application, such as a mobile phone/device or desktop application (e.g., print procurement application 224). The user interfaces described in reference to FIGS. 6A-6B are merely examples and additional user interfaces for print procurement applications are also shown in FIGS. 8A-8W and FIGS. 9A-9D (as discussed in more detail below) and may be used to perform some of the functions described with respect to the user interfaces in FIGS. 6A-6B.

As shown in FIG. 6A, a web browser (e.g., web browser 220, FIG. 2) of a user computing device (e.g., user computing device 102-1) is used to render information received from a server (e.g., one or more print procurement servers 106, FIG. 1) in order to display a print procurement web application (e.g., print procurement web application 222, FIG. 2). In some embodiments, the print procurement web application 222 displays information about buy groups that is retrieved from one or more servers 106 (FIGS. 1 and 3) and the displayed information includes user interface region 612. In some embodiments and as shown in FIG. 6A, the user interface region 612 includes ordering information across multiple shipping locations for one or more physical items that are part of one or more buy groups (e.g., item ID 5 of print job 4). In some embodiments, the user interface region 612 includes a preview of the item (e.g., the item 1 preview as shown in FIG. 6A), current interest levels across each shipping location that is associated with the buy group, and the subtotal of interest levels across all shipping locations. In some embodiments, a row of information associated with a particular physical item in the buy group is referred to herein as a user interface object for that particular physical item (e.g., a first user interface element for item 1 includes the current interest levels across each shipping location and the subtotal interest level. In some embodiments, the subtotal and current interest levels also display pricing information that is available provided the subtotal/aggregate interest level satisfies a threshold interest level for the particular physical item.

To provide users with a clear indication as to how close an aggregate interest level is to satisfying the threshold interest level, a visual representation (such as a progress bar 608 and a textual description 610 as to whether the threshold has been met) is also provided. For example, progress bar 608 indicates that the aggregate interest level of item 1 is about halfway toward satisfying the threshold interest level and textual description 610 indicates that the threshold for securing a $30/unit price has not yet been met. In some embodiments (as explained in more detail below in reference to FIG. 7 and FIGS. 8A-8W), the visual representations for each physical item in the buy group are dynamically updated as remotely located users continue to modify the current interest levels for each of the shipping locations. In this way, each user is constantly reminded as to how close the buy group is to achieving a particular threshold-specific price for one of the buy group's physical items.

In some embodiments, each user interface object for each physical item is selectable, so that users can view item-specific information, instead of a detailed overview page for the entire buy group. For example, in response to detecting user input at the item 1 preview (e.g., in response to detecting user input 604, FIG. 6A), a new item-specific page is displayed to the user. In some embodiments, in response to detecting the user input 604, the print procurement web application 222 is updated (e.g., by receiving data from one of the print procurement servers 106) to display a user interface similar to the one shown in FIG. 6B (additional examples of item-specific detail pages are provided in FIGS. 8H, 8I, and 8K).

As shown in FIG. 6B, an item-specific detail page for a particular physical item in the buy group includes product details for the particular physical item, a preview of the item, and a new visual representation of whether a current aggregate interest level for the particular physical product has satisfied a threshold interest level for the particular physical product (e.g., visual representation 620, including a progress bar and a textual description).

Additional details regarding the user interfaces shown in FIGS. 6A-6B are provided below in reference to FIGS. 8A-8W. In some embodiments, the visual characteristics of the user interfaces shown in FIGS. 6A-6C include one or more visual characteristics of the user interfaces shown in FIGS. 8A-8W.

Figure 6C:
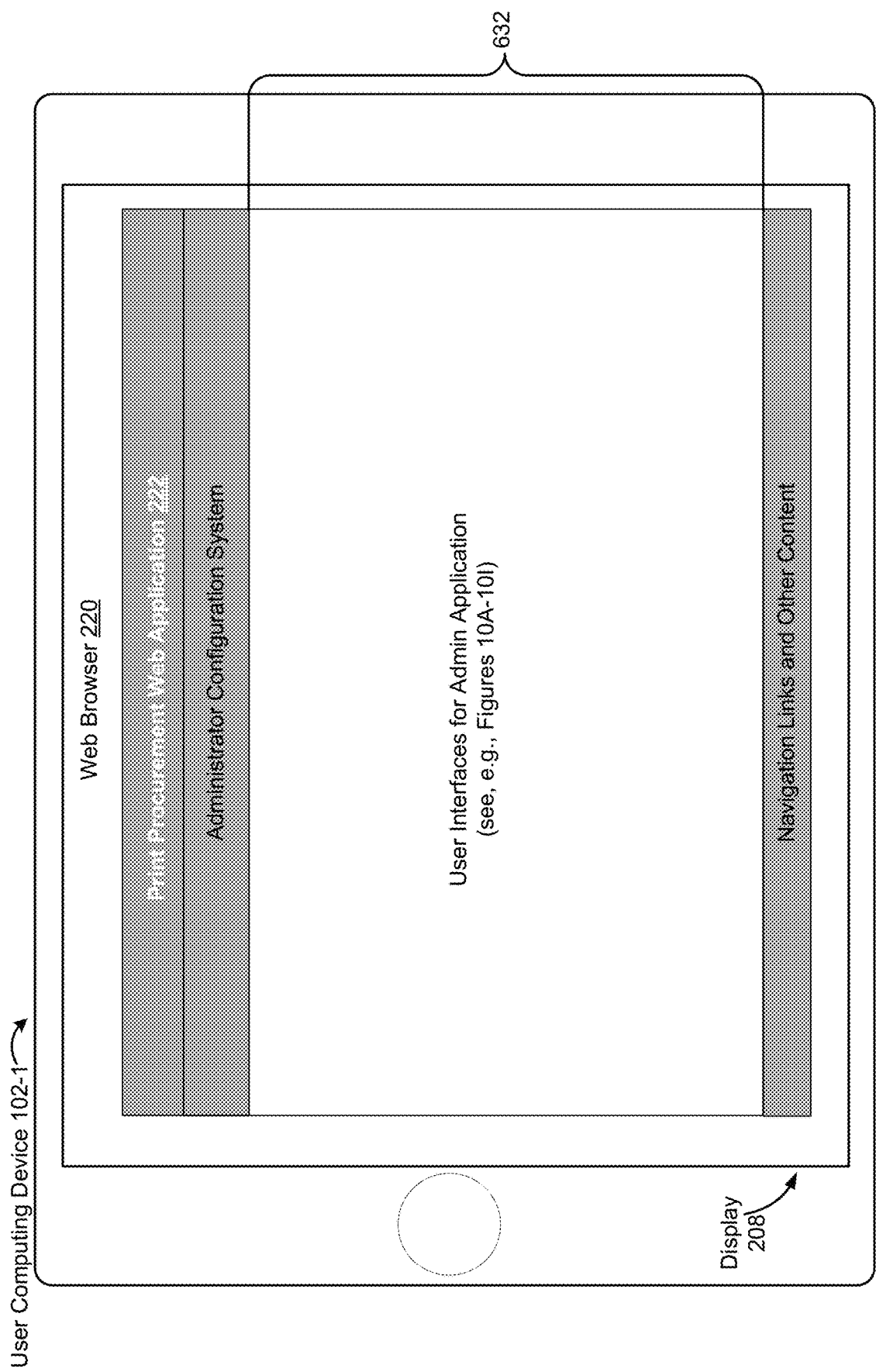
FIG. 6C is a schematic of a display illustrating an example user interface for displaying and interacting with information about buy groups in an administrative user interface (or an administrative application component of a print procurement system), in accordance with some embodiments.

Turning now to FIG. 6C, a schematic of a display used to illustrate an example user interface for an administrative application within a print procurement system is shown. In some embodiments, the display of FIG. 6C (and a device, such as a mobile device associated with the display) is used to render a number of pages associated with the administrative application (such as the user interfaces shown in FIGS. 10A-10I). In some embodiments, the administrative application is accessed by an administrator and allows the administrator to create/configure buy groups, assign users and shipping locations to buy groups, configure threshold interest levels for physical items within buy groups based on information about current promotions/special pricing options from suppliers of the physical items, etc.

FIG. 7 is a flowchart depicting a method 700 of a method of efficiently managing buy groups in a print procurement system, in accordance with some embodiments. FIGS. 8A-8W and FIGS. 9A-9D are used to illustrate the methods and/or processes of FIG. 7. In some embodiments, each of the user interfaces presented in FIGS. 8A-8W and FIGS. 9A-9D are presented on a display of a computing device (e.g., display 208 of user computing device 102-1, as pictured for the user interfaces shown in FIGS. 6A-6C). Although some of the examples which follow will be given with reference to inputs on a touch-sensitive display (e.g., of a mobile phone or a tablet device, in which a touch-sensitive surface and a display are combined), in some embodiments, the device detects inputs on a touch-sensitive surface that is separate from the display 208 (e.g., a desktop or a laptop computing device).

In some embodiments, the method 700 is performed by an electronic device (e.g., computing device 102-1, FIG. 2) and/or one or more components of the electronic device. In some embodiments, the method 700 is governed by instructions that are stored in a non-transitory computer-readable storage medium and that are executed by one or more processors of a device, such as the one or more processors 202 of device 102-1 (FIG. 2). For ease of explanation, the following describes method 700 as performed by the device 102-1. In some embodiments, with reference to FIG. 2, the operations of method 700 are performed by or use, at least in part, a web browser (e.g., web browser 220), a print procurement web application (e.g., print procurement web application 222), a print procurement application (e.g., print procurement application 224), a buy group management module (e.g., buy group management module 226), a buy group data fetching module (e.g., buy group data fetching module 228), and/or a display (e.g., display 208). Some operations in method 700 are, optionally, combined and/or the order of some operations is, optionally, changed (e.g., by combining and or replacing some operations with those discussed below in reference to method 1100 of FIG. 11).

As described below, the method 700 provides a fast, intuitive, easy-to-use, and robust way to manage buy groups (and, in particular, ensures that remotely located shipping locations are able to collectively take advantage of threshold-specific pricing options in a print procurement system (in some embodiments, no one shipping location would be able to satisfy the threshold alone)). Furthermore, managing buy groups in this way in print procurement systems allows users to create more sophisticated and efficient marketing campaigns across remotely located offices, thereby allowing users to make better-informed and cost-saving business decisions.

Figure 8A:
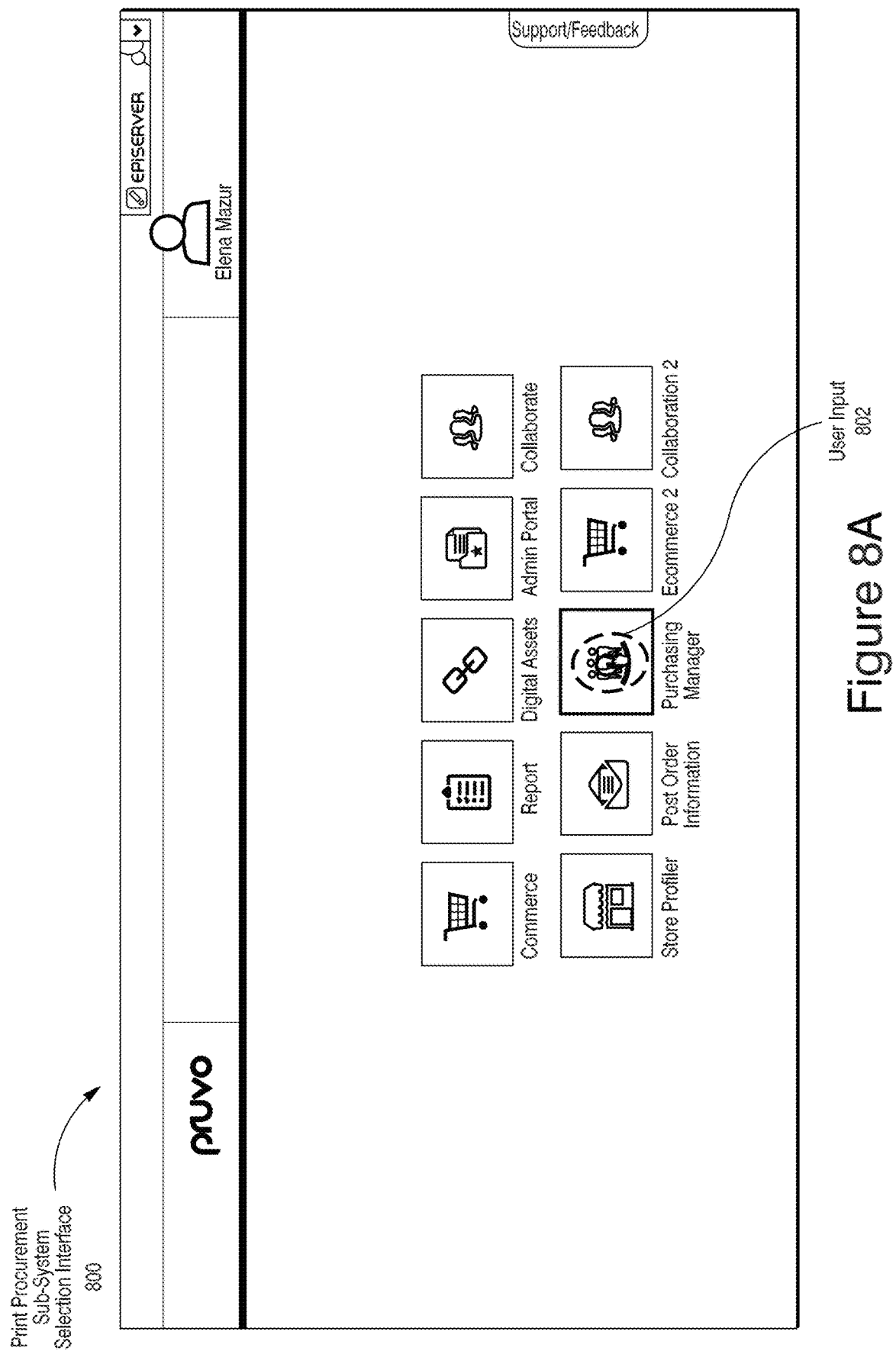
FIGS. 8A-8W are schematics of a display used to illustrate example user interfaces for a method of efficiently managing print procurement orders based on item-specific interest levels and supplier-influence thresholds, in accordance with some embodiments.

Referring now to FIG. 7, a print procurement application (e.g., executing locally on a computing device 102 or executing through a client-server or web-based architecture by sending information between the computing device 102 and a server 106, FIG. 1) receives a request from a user to navigate to a purchasing manager application within the print procurement application (e.g., by receiving user input 802 over an affordance for the purchasing manager application, as shown in the print procurement sub-system selection interface 800 in FIG. 8A). In response to receiving the user input 802, the computing device displays identifiers for buy groups that are associated with the user (i.e., buy groups for which an administrator has given the user access to). For example, as shown in the select buy group user interface 801 in FIG. 8B, identifiers for two distinct buy groups are shown, "First Buy Group" and "Second Buy Group." In some embodiments, the select buy group user interface 801 includes information identifying a number of users for that buy group that are currently online (e.g., ⅙ users are currently online for "First Buy Group" and 0/1 users are currently online for "Second Buy Group," FIG. 8B). By displaying the information identifying the number of users that are currently online, the user may be motivated to view ordering information for an active buy group (i.e., a buy group that has many users online simultaneously).

Figure 8B:
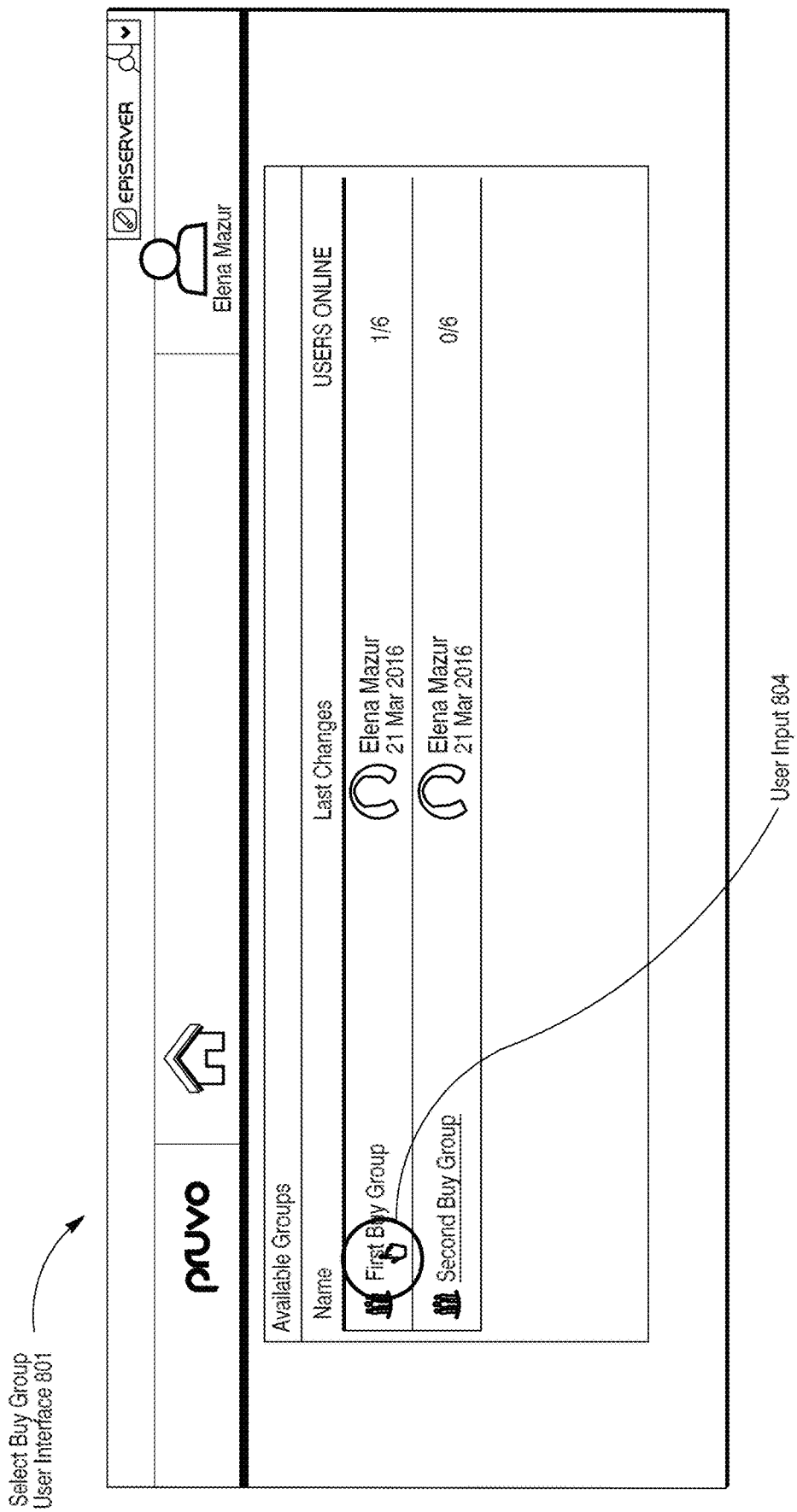

The computing device then receives (702), from a user of the computing device, a request to view ordering information for a fixed plurality of physical items that are associated with a first time period (e.g., the first time period is a period of time during which the fixed plurality of physical items is available to associated users). For example, the request corresponds to user input 804 near an identifier for a particular buy group (as shown in FIG. 8B). In some embodiments, the fixed plurality of physical items is not editable (704) by the user and the user cannot add (or remove) physical items to/from the fixed plurality. Stated another way, the fixed plurality of physical items is a predefined catalog of physical items that cannot be modified by the user. In this way, an administrator is able to ensure that physical items that are part of particular buy groups remain fixed (as explained below, the administrator configures the buy group before method 700 begins, using user interfaces similar to those described below in reference to FIGS. 10A-10I). In some embodiments, the fixed plurality of physical items is a buy group (704).

Figure 8C:
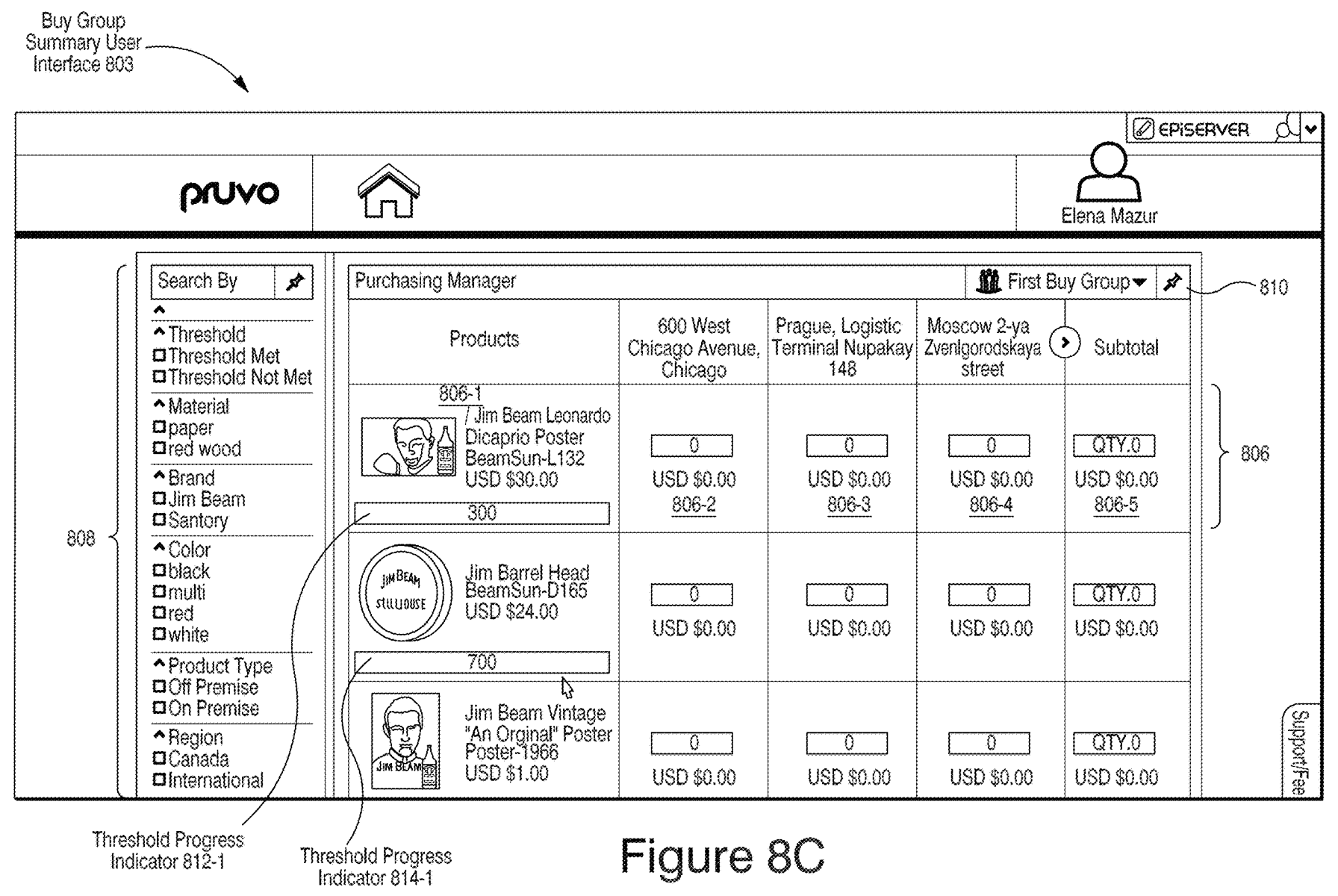

In response to receiving the request, the computing device displays (706) on the display a respective user interface object for each physical item of the fixed plurality of physical items (e.g., a row of ordering information for each physical item, such as user interface object 806 that includes a row of ordering information for a first physical item in the fixed plurality of physical items, as shown in FIG. 8C). In some embodiments, the respective user interface objects are displayed in a buy group summary user interface, such as buy group summary user interface 803 shown in FIG. 8C. In some embodiments, the buy group summary user interface 803 also includes a search by interface for filtering the fixed plurality of physical items according to one or more criteria and includes information about users associated with the buy group (such as 810, which is currently hidden, but may be expanded to show details regarding each user associated with the buy group, as explained below in reference to FIGS. 8L-8O).

As noted above, in some embodiments, each user interface object in the buy group summary user interface 803 includes ordering information for a respective physical item in the fixed plurality of physical items. For example, user interface object 806 includes a first user interface element 806-1 that includes a description of a first physical item in the fixed plurality of physical items and also includes a target price for the first physical item (e.g., USD $30.00) that is secured if the buy group is able to meet a threshold interest level for the first physical item (i.e., if the buy group's users indicate that they have an interest in a quantity of the first physical item that is greater than or equal to the threshold interest level, then the threshold interest level is met/satisfied). In some embodiments, the first user interface element 806-1 also includes a threshold progress indicator 812-1 that provides a visual representation of an aggregate interest level for the first physical item as compared to the threshold interest level for the first physical item (e.g., the threshold progress indicator 812-1 in FIG. 8C shows that the aggregate interest level is currently 0 and, thus, no progress has been made toward satisfying the threshold interest level).

In some embodiments, a first user interface object (e.g., 806, FIG. 8C) for a first physical item includes a visual representation of an aggregate interest level for the first physical item during the first time period as compared to a threshold interest level for the first physical item (e.g., threshold progress indicator 812-1), and the aggregate interest level reflects a quantity of the first physical item requested by the user and at least one other user (708). In some embodiments, the aggregate interest level reflects a quantity requested by all users associated with the buy group. In some embodiments, the visual representation includes (712) a progress bar (e.g., threshold progress indicator 812-1, FIG. 8C) and a textual description as to whether the threshold interest level for the first physical item has been met (e.g., threshold progress indicator 812-2, FIG. 8D). In some embodiments, the textual description is displayed in response to user input that modifies a respective current interest level at one of the shipping locations for the buy group (e.g., in response to user input 816 that updates a current interest level for a first shipping location from 0 to 100, the textual description 812-2 is displayed, FIG. 8D).

In some embodiments, the user and the at least one other user are each associated (710) with distinct shipping locations and the aggregate interest level reflects interest levels across one or more shipping locations, the one or more shipping locations including the distinct shipping locations. For example, the user is associated with a first shipping location of "600 West Chicago Avenue, Chicago" and the at least one other user is associated with a second shipping location in Prague. In some embodiments, the user is associated with multiple shipping locations (e.g., so that the user is able to edit interest levels for each of those multiple shipping locations). As shown in FIG. 8C, user interface elements are displayed that provide information regarding current location-specific interest levels (e.g., 806-2 displays a current interest level for the first physical item by the first shipping location, 806-3 displays a current interest level for the first physical item by the second shipping location, 806-4 displays a current interest level for the first physical item by a third shipping location, etc.) and the aggregate interest level across all shipping locations (e.g., as shown by user interface element 806-5, FIG. 8C). In some embodiments, displaying the current interest levels includes displaying both a quantity that corresponds to each respective interest level and a total dollar amount to purchase that quantity (i.e., each of the fields 806-2, 806-3, and 806-4 includes respective numerical values that represent a quantity and a total dollar amount based on the current interest level for each respective shipping location, as shown in FIG. 8E). For example, the current interest level for the first shipping location ("600 West Chicago Avenue, Chicago") is 100 and, as shown in FIG. 8E, field 806-2 includes a first numerical value that is representative of a quantity that corresponds to the current interest level for the first location (e.g., "100") and a second numerical value that is representative of a total dollar amount that corresponds to an amount required to purchase the quantity (e.g., "$3000.00", which may also specify a currency, such as "USD").

FIG. 8C also shows that threshold progress indicators are shown for each physical item in the fixed plurality (e.g., threshold progress indicator 814-1 is shown for a second physical item in the fixed plurality), thus providing users with a clear indication as to how close each respective physical item is to its corresponding threshold interest level.

Figure 8D:
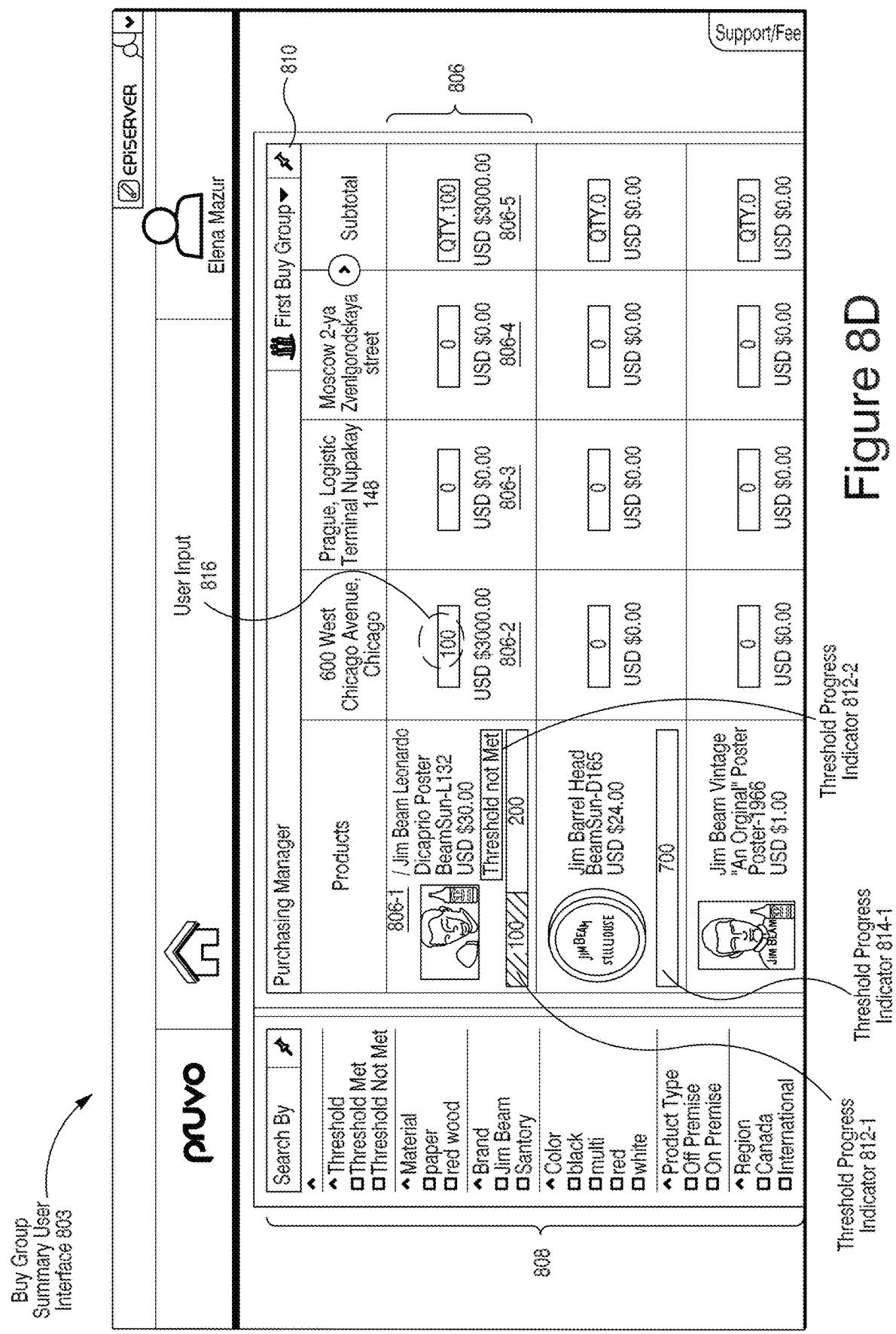
Figure 8F:
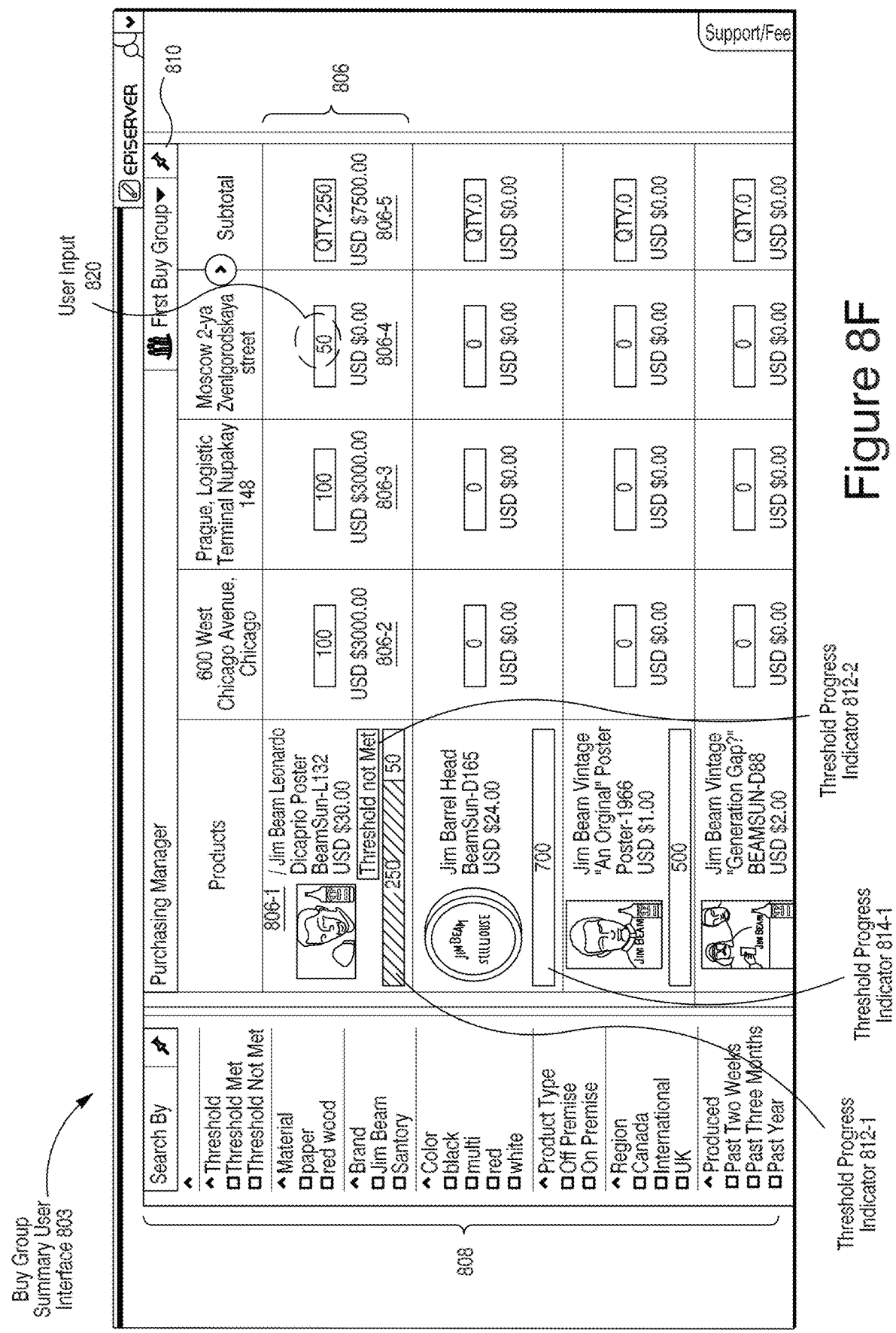
Figure 8G:
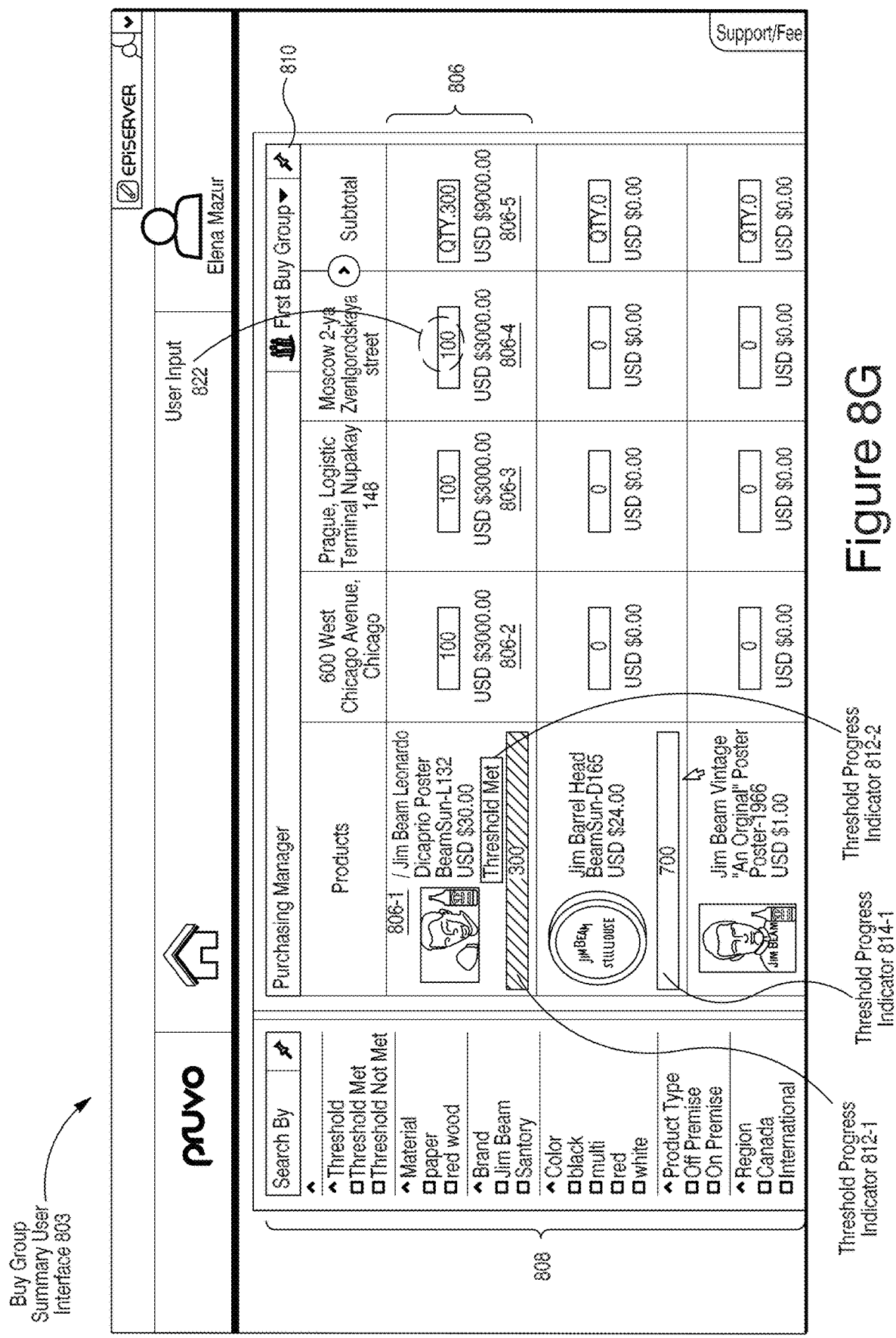

Turning now to FIGS. 8D-8G, a sequence of updated buy group summary user interfaces 803 is shown as interest levels in the first physical item for the shipping locations are modified. As shown in FIG. 8D, in response to user input 816, the threshold progress indicator 812-1 is updated to reflect progress toward satisfying the threshold interest level for the first physical item and threshold progress indicator 812-2 is also displayed in response to the user input 816. In FIGS. 8E, 8F, and 8G, additional user inputs are received (e.g., user inputs 818, 820, 822, respectively) and the threshold progress indicator 812-1 is updated accordingly. Additionally, as shown in FIG. 8G, in accordance with a determination that the threshold interest level has been satisfied, the threshold progress indicator 812-2 is updated to indicate clearly that the threshold has been met.

In some embodiments, the user inputs shown in FIGS. 8D-8G are received from different users that are each associated with the buy group. In this way, the print procurement application is able to quickly provide other users with a clear visual cue as to how close they are to crossing a threshold interest level for each physical item in the buy group. For example, while displaying the respective user interface objects for each physical item of the fixed plurality of physical items, the computing device receives (714) an indication (e.g., receives the indication from a server, such as server 106, FIG. 1) that the threshold interest level for the first physical item has been satisfied. In some embodiments, the indication that the threshold interest level for the first physical item has been satisfied is received after (716) a second user, distinct from the user, modifies the ordering information (e.g., the second user provides the user input 822 shown in FIG. 8G that causes the aggregate interest level for the physical item to cross its threshold interest level). In accordance with receiving the indication, the computing device updates (718) the first user interface object to indicate that a threshold-specific price has been secured for the first physical item (e.g., by updating the threshold progress indicators 812-1 and 812-2 as shown in FIG. 8G). In some embodiments, this allows users to easily see what interest other users (e.g., those located in disparate geographies) are expressing in particular physical items. This allows companies that have disparately located groups to have a single place where ordering details can be consolidated, in order to achieve lower price per unit costs and also achieve consistency in materials utilized for various marketing campaigns.

Figure 8H:

In some embodiments, additional user interfaces are provided by the print procurement application in conjunction (or during) with the operations discussed above. For example, users are able to select a particular physical item in order to view an item-specific details page (e.g., in response to detecting user input at user interface element 806-1, the user is navigated to (i.e., the computing device displays) an item detail user interface 805, FIG. 8H). In some embodiments, the item-specific details page provides ordering information that is specific to the first physical object (e.g., product information, dimensions, description, a preview image, and the like, as shown in FIG. 8H). In some embodiments, the item-specific details page also includes a new representation of the current interest level for the first physical object during the first time period as compared to the threshold interest level for the first physical item (e.g., user interface element 830, FIG. 8H, which also includes a textual description as to whether the threshold interest level has been met).

In some embodiments, users are further able to zoom-in on a preview image for the first physical item (e.g., in response to user input 850, the computing device displays a zoomed-in preview image, FIG. 8I). In some embodiments, the zoomed-in preview image is only available for those physical items for which an administrative user has affirmatively indicated that the zoomed-in preview feature is enabled (e.g., via selecting an appropriate radio button in a configure buy group items 1050 interface, FIG. 10I).

Figure 8J:
Figure 8K:
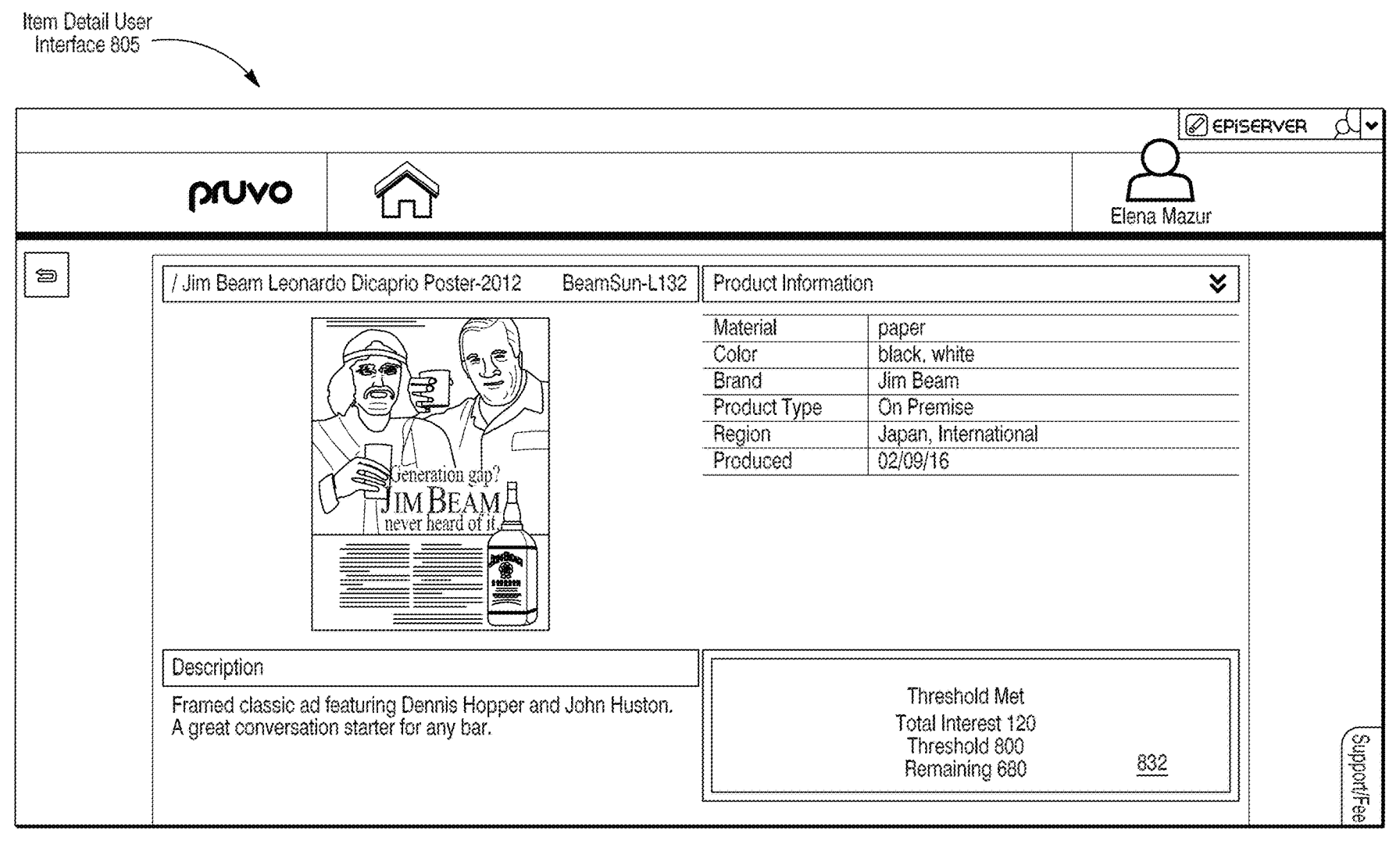

As shown in FIG. 8J, after the threshold interest level for the first physical item has been met, users may continue to modify current interest levels across shipping locations for each of the fixed plurality of physical items. In some embodiments, users cannot modify current interest levels for the first physical item after it crosses the threshold interest level (in order to ensure that the threshold-specific price remains locked in). As shown in FIG. 8J, as users modify interest levels for other items, the corresponding visual indicators are also updated (e.g., in response to user input 870 increasing a current interest level for a shipping location in Moscow from 0 to 100, the computing device displays/updates a threshold progress indicator 814-1 and 814-2 accordingly). Additionally, users may continue to select individual physical items in order to view item-specific detail pages (e.g., item detail user interface 805, FIG. 8K, for a second physical item distinct from the first physical item, the interface 805 including a visual representation of the second physical item's aggregate interest level relative to a threshold interest level for the second physical item).

Figure 8L:
Figure 8M:
Figure 8N:
Figure 80:

FIGS. 8L-8O also illustrate additional features that allow users to collaborate efficiently within a particular buy group and to encourage users to reach item-specific thresholds. As shown in FIG. 8L, in response to user input 882 near (expanded) user interface element 810, the computing device allows the user to move the expanded user interface element 810 to a desired position within the buy group summary user interface 803 (FIG. 8M). FIGS. 8M-8O also show that as the computing device receives indications (e.g., from a server 106, FIG. 1) that a different user is editing a current interest level at a shipping location for one of the physical items, the computing device displays a visual indication that indicates to the user both (i) that the current interest level at the shipping location is being actively modified and (ii) who is making the modifications (e.g., by shading with a color that corresponds to a user that is making the modifications, such as a color that corresponds to a color used to identify that user within expanded user interface element 810). More specifically, in FIG. 8M, the computing device receives indications that user "A.G." and user "S.R." are modifying current interest levels for a "J.B. . . . Poster" item and, in response to receiving these indications, the computing device displays a clear visual indication that a modification is being made and who is making that modification. As shown in FIG. 8N, S.R. has ceased modifying a current interest level for the J.B. Poster and is now modifying a current interest level for a "J.B.H." item and, thus, the buy group summary user interface 803 is updated accordingly. Finally, in FIG. 8O, the computing device receives indications that user "S.R" is modifying a current interest level for the J.B.H. in a different location (e.g., a fourth location in the buy group), A.G. continues to modify the same current interest as before, and user "A.S." is modifying a current interest level for the J.B. Poster, and, in response to receiving these indications, the computing device updates buy group summary user interface 803 accordingly (FIG. 8O).

Figure 8P:
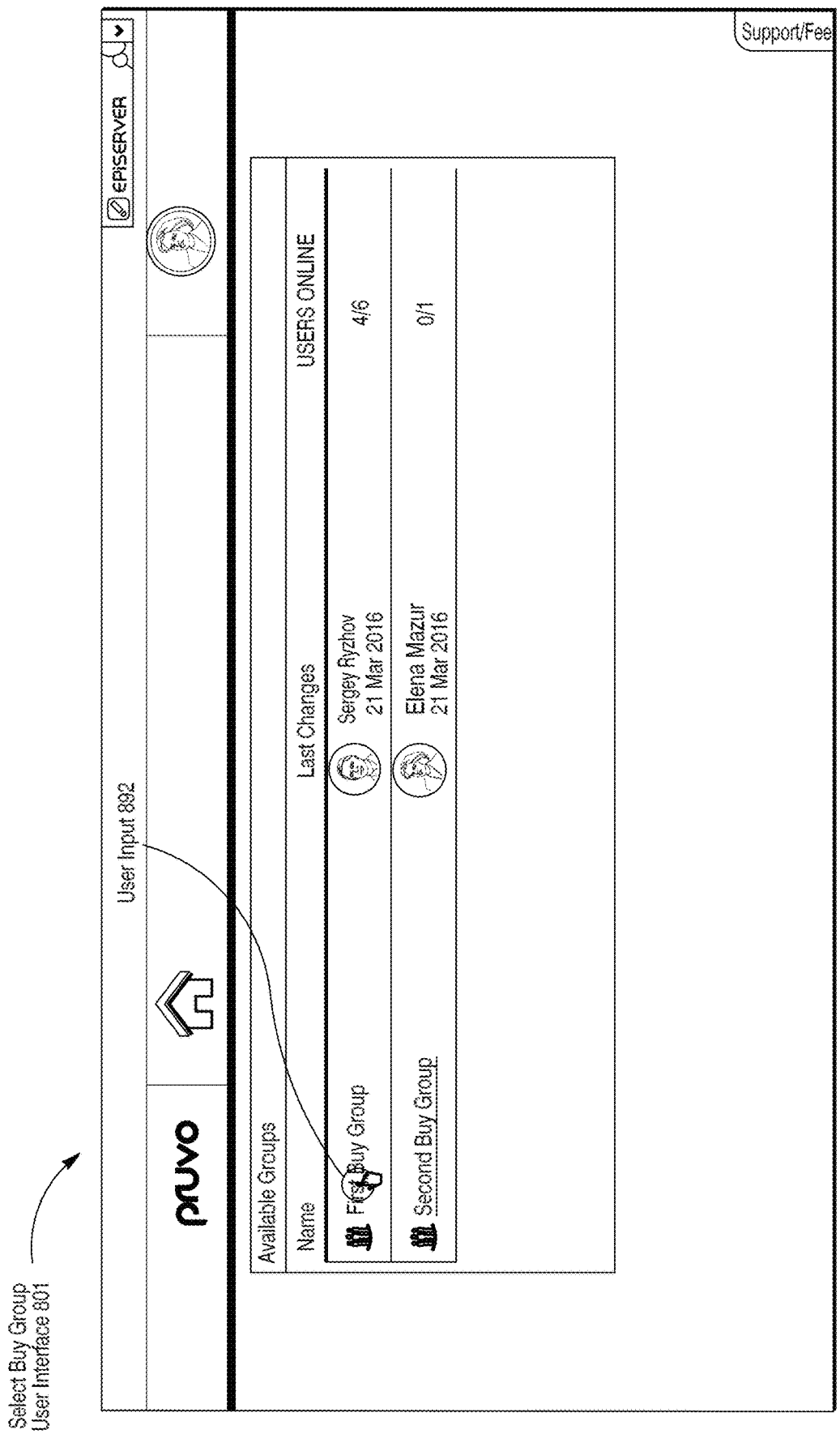
Figure 8Q:
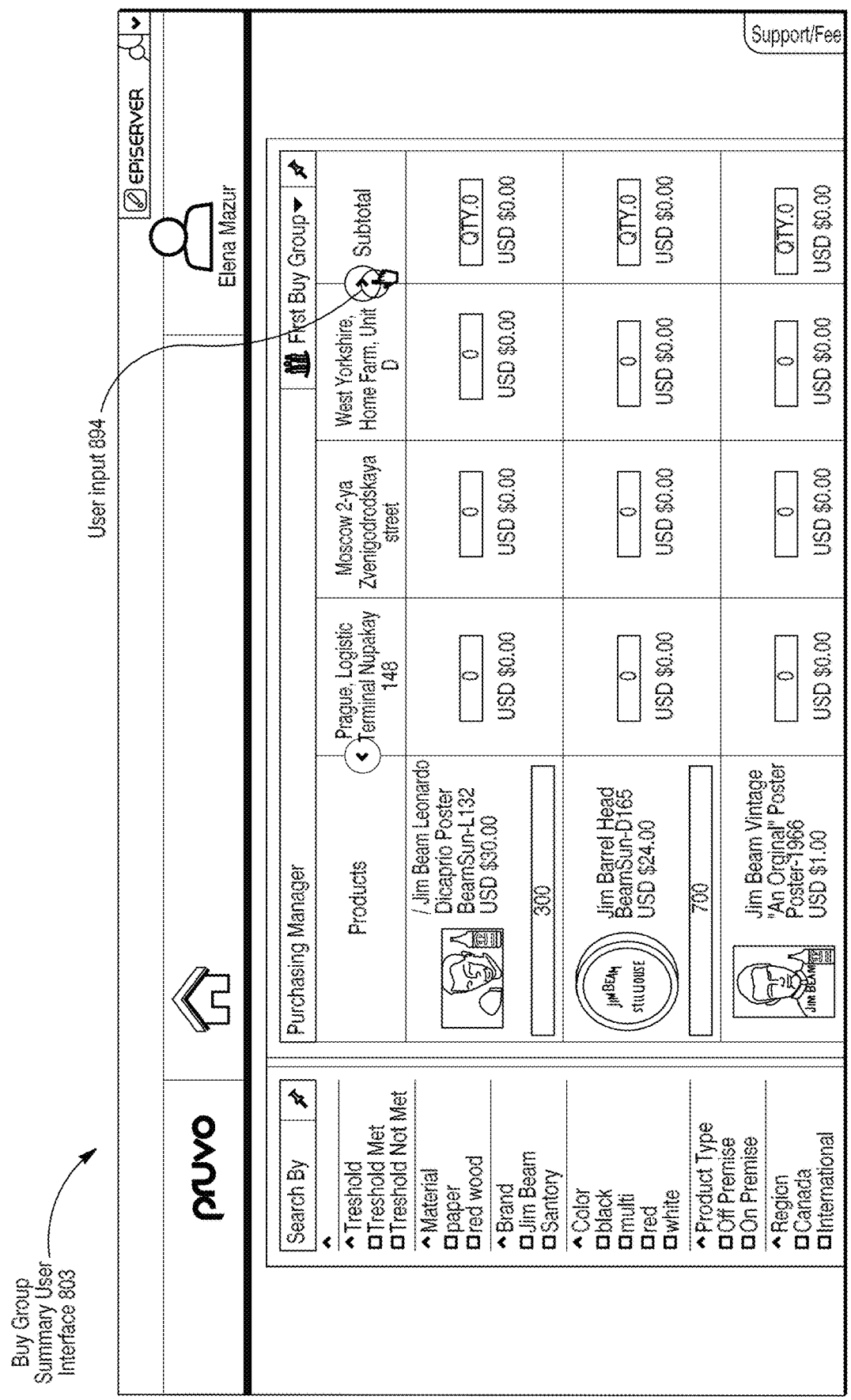
Figure 8R:
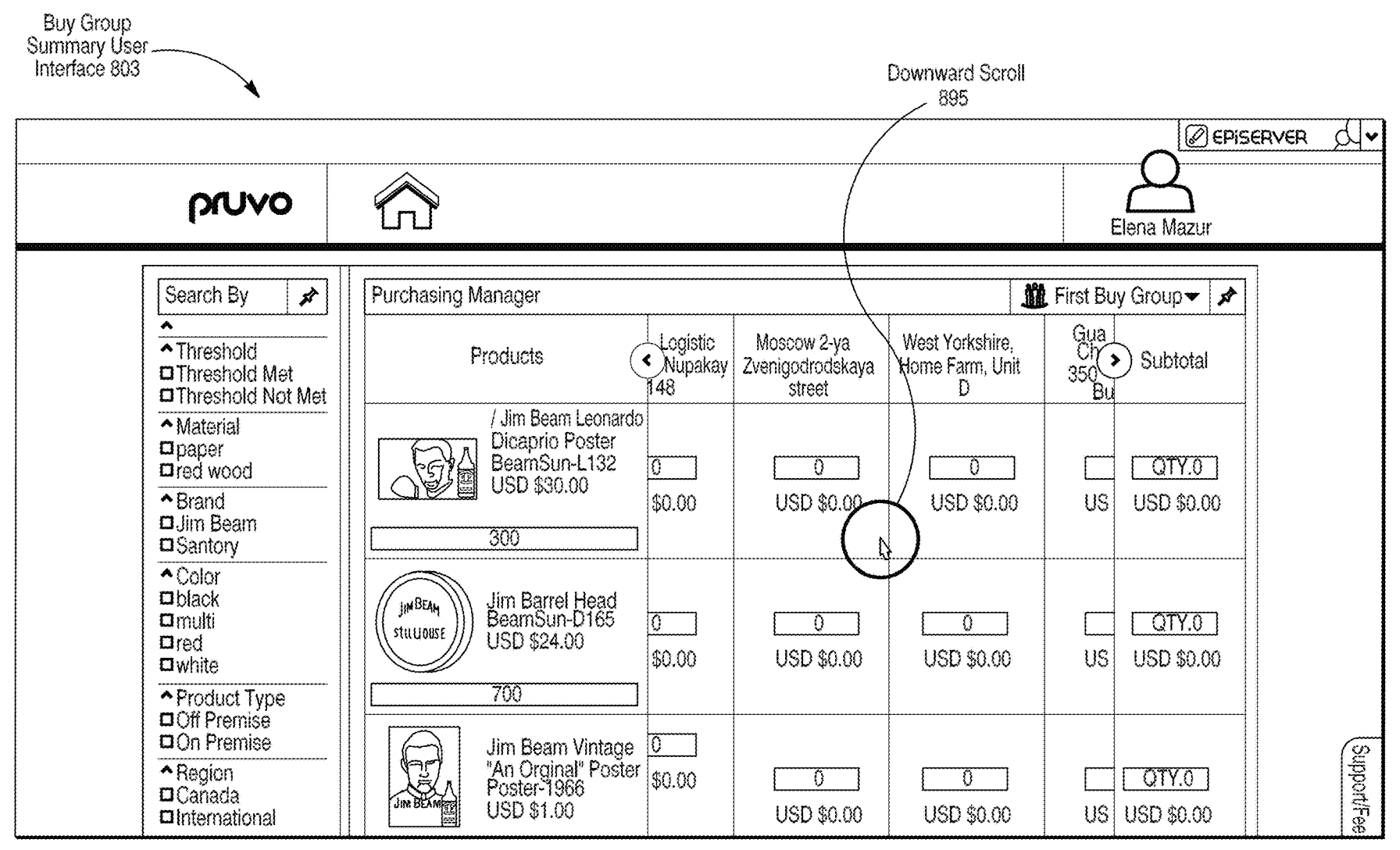
Figure 8S:
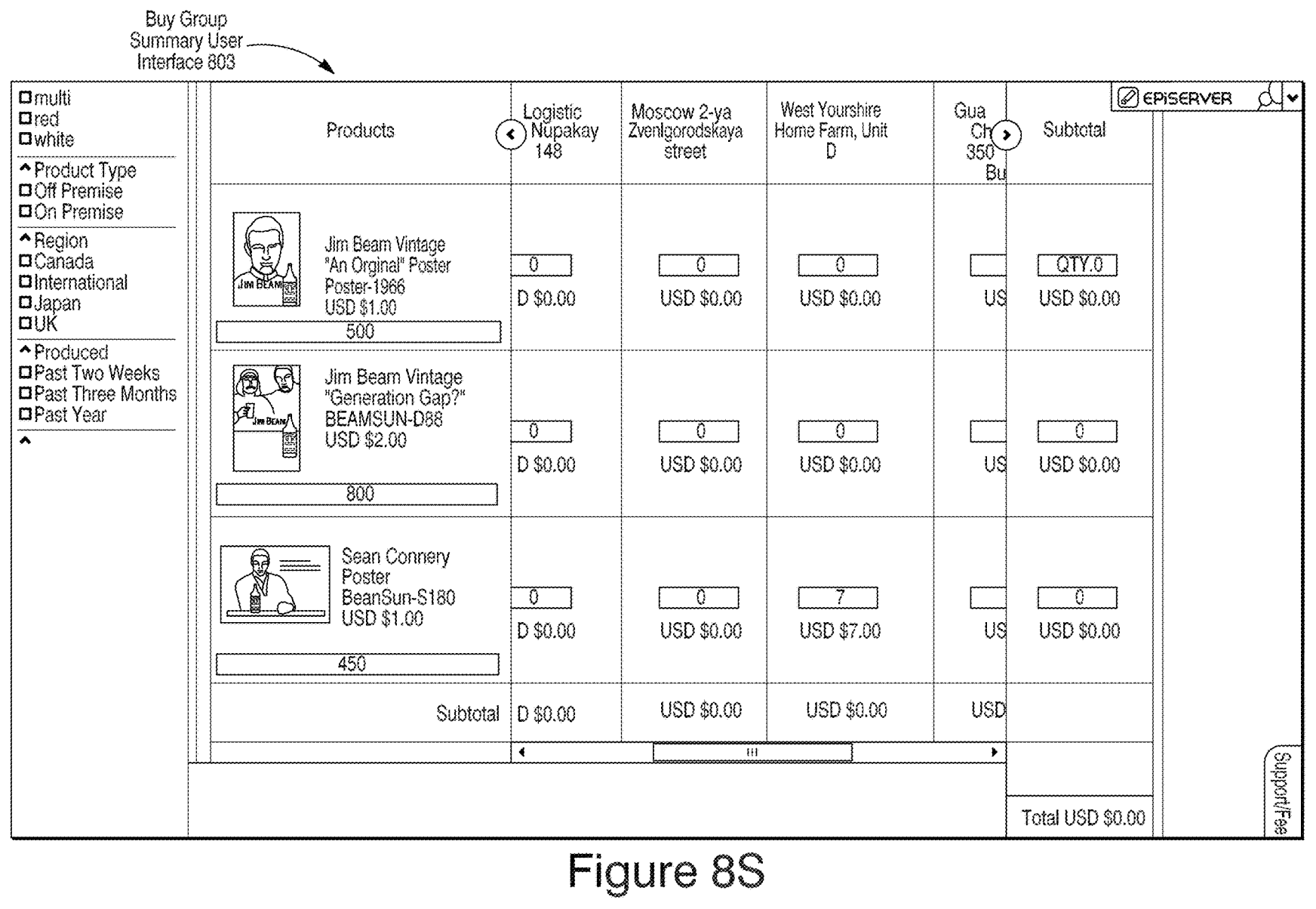

In some embodiments, to provide additional information to users regarding modifications to current interest levels, the select buy group user interface 801 is also updated to reflect which user most recently modified current interest levels in a particular buy group (e.g., as shown in FIG. 8P, user "S.R." last modified First Buy Group and user "E.M." last modified Second Buy Group). In response to user input 892, the computing device displays buy group summary user interface 803. In some embodiments, the computing device receives a request to view shipping locations in addition to the at least two of the one or more (currently displayed) shipping locations (e.g., user input 894 at a rightward-pointing arrow graphic, FIG. 8Q) and, in response, the computing device updates the first user interface object to include a respective numerical value that reflects a respective interest level for an additional shipping location of the one or more shipping locations (e.g., respective interest levels for each physical item in the fixed plurality for a newly displayed shipping location, "West Yorkshire," are then displayed within the buy group summary user interface 803, FIG. 8R). In some embodiments, in addition to navigating across to different shipping locations, users may also navigate in a substantially vertical direction in order to view ordering information for additional physical items within the buy group/fixed plurality (e.g., in response to receiving a request from the user to scroll the buy group summary user interface 803 in a downward direction, the computing device determines whether additional physical items are in the buy group and, in accordance with a positive determination, the computing device displays ordering information for at least one of the additional physical items). For example, ordering information for a "S.C. Poster" is additionally displayed within the buy group summary user interface 803 (FIG. 8S).

Figure 8T:
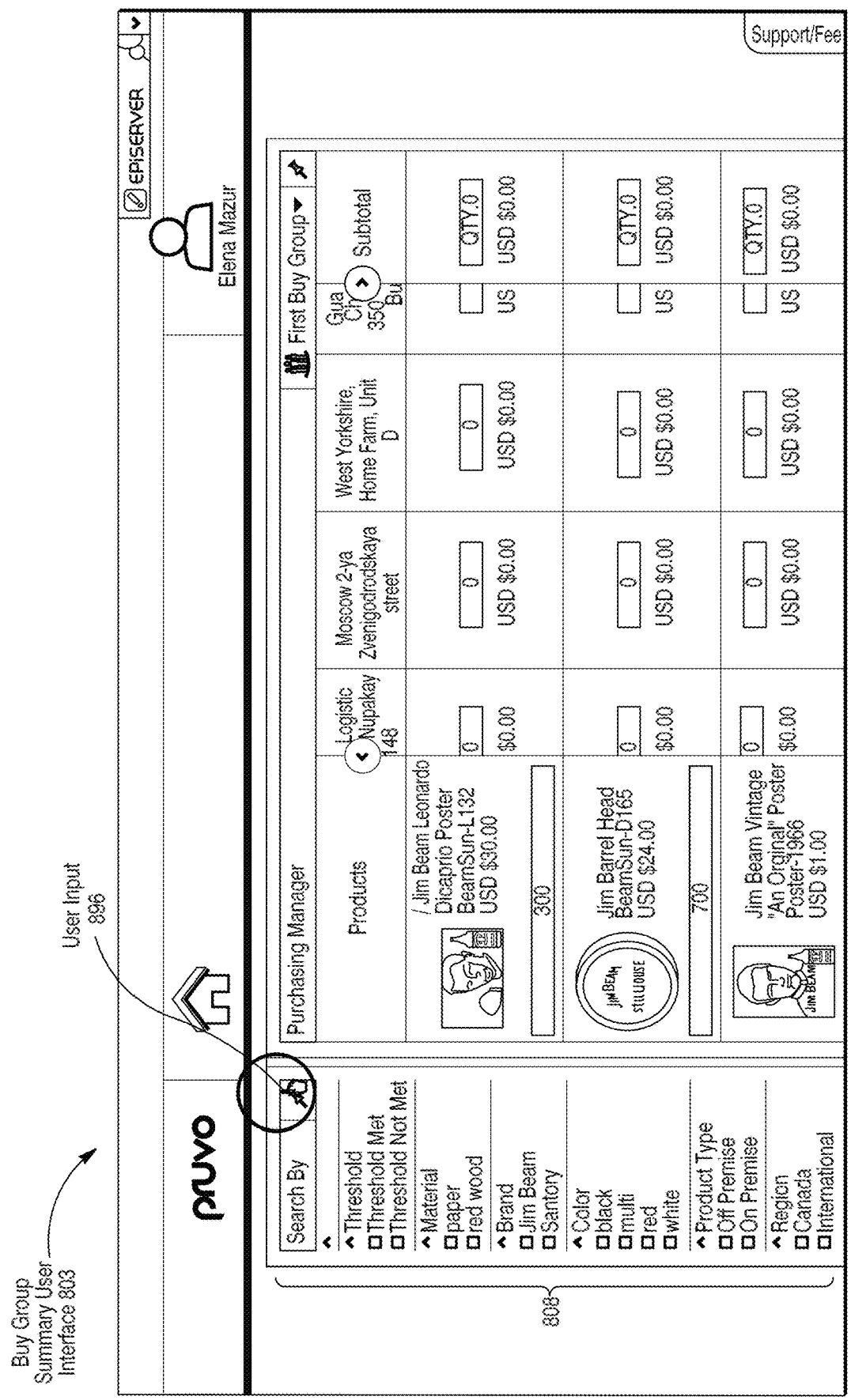
Figure 8U:
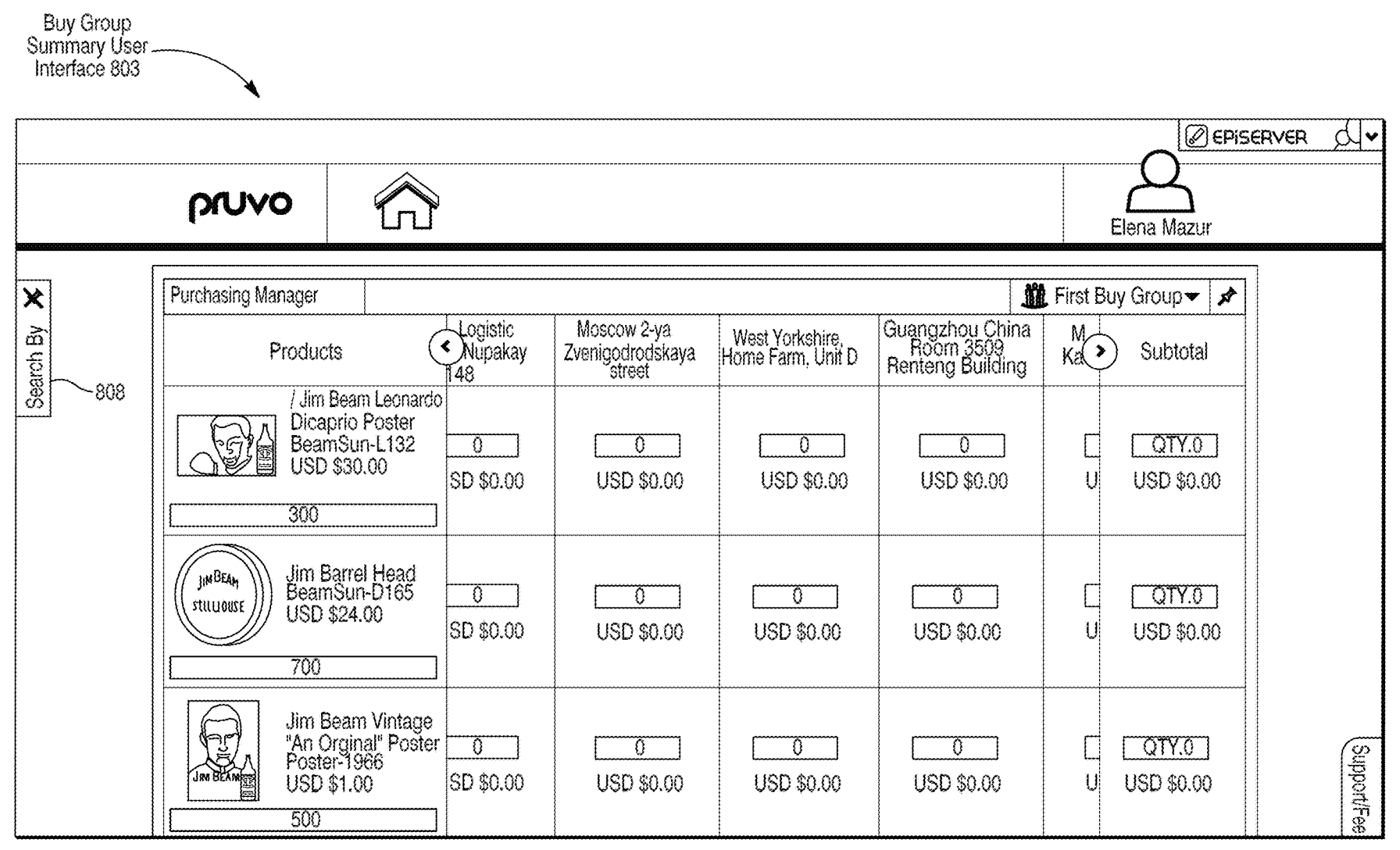
Figure 8V:
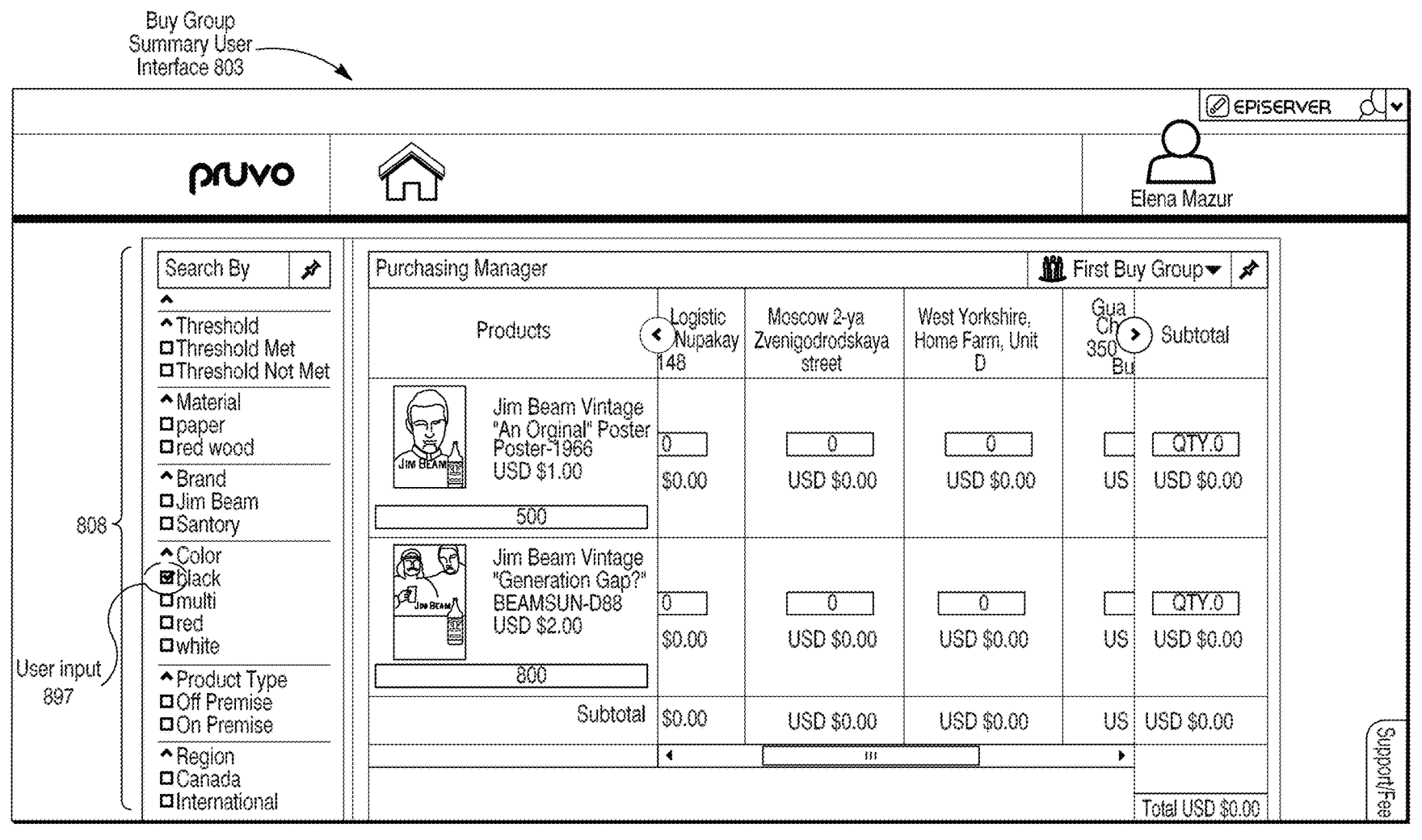
Figure 8W:
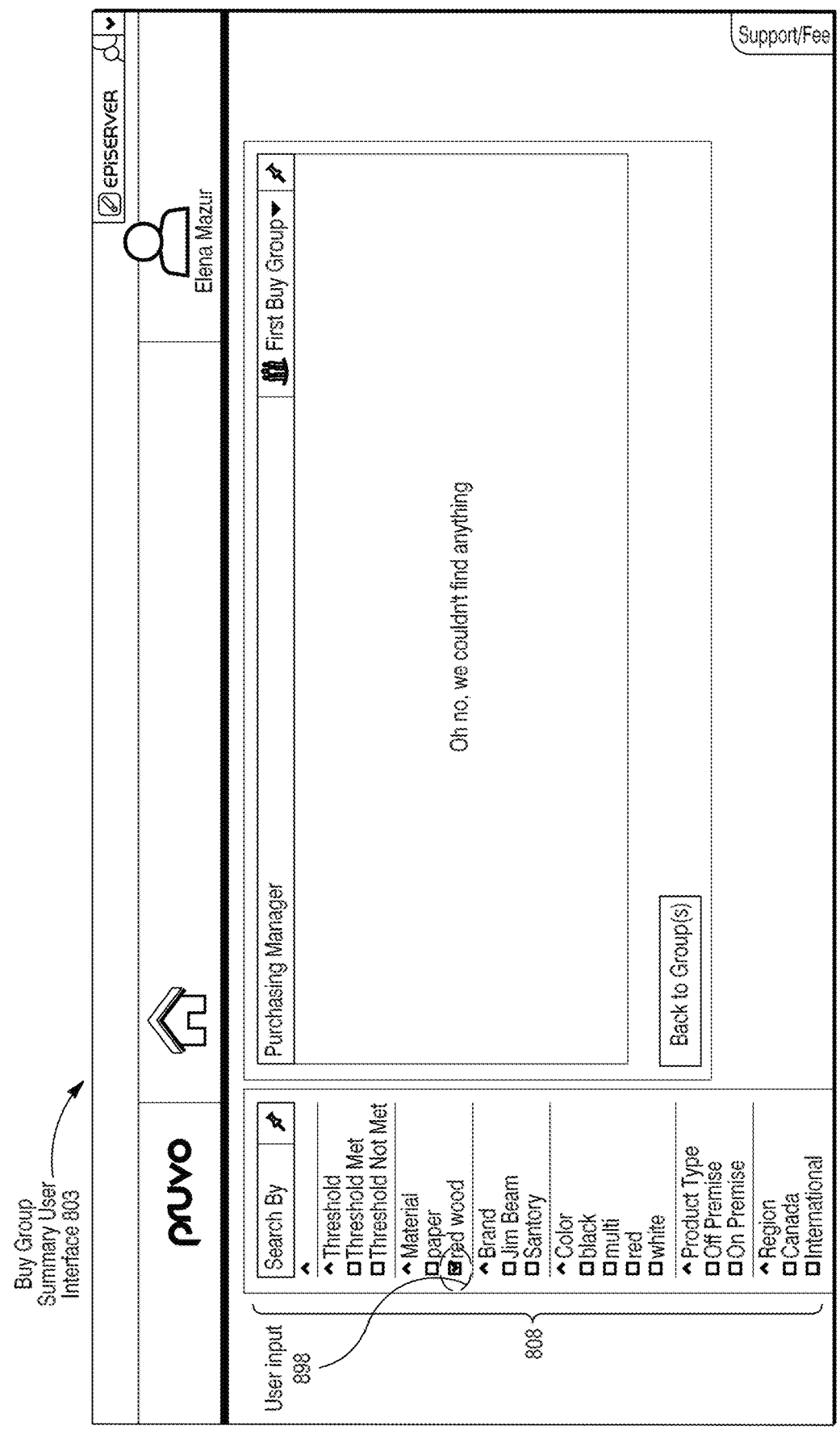

In some embodiments, users are also able to collapse and expand search filters (e.g., search filters associated with interface 808 are collapsed in response to user input 896, FIGS. 8T-8U). In some embodiments or circumstances, by easily collapsing the interface 808, users are able to quickly view ordering information for some additional shipping locations. As shown in FIGS. 8V-8W, users are also able to use the search filters within interface 808 to filter down currently displayed physical items (i.e., if there are a very large number of physical items in the fixed plurality, users can easily filter down the displayed list in the summary interface 803 in order to quickly find desired items). For example, in response to user input 897 selecting a filter of color: black, only those items matching this selected filter are displayed (FIG. 8V). As shown in FIG. 8W, if no items match currently selected filters, then an indication is shown that no matching items were found.

Figure 9A:
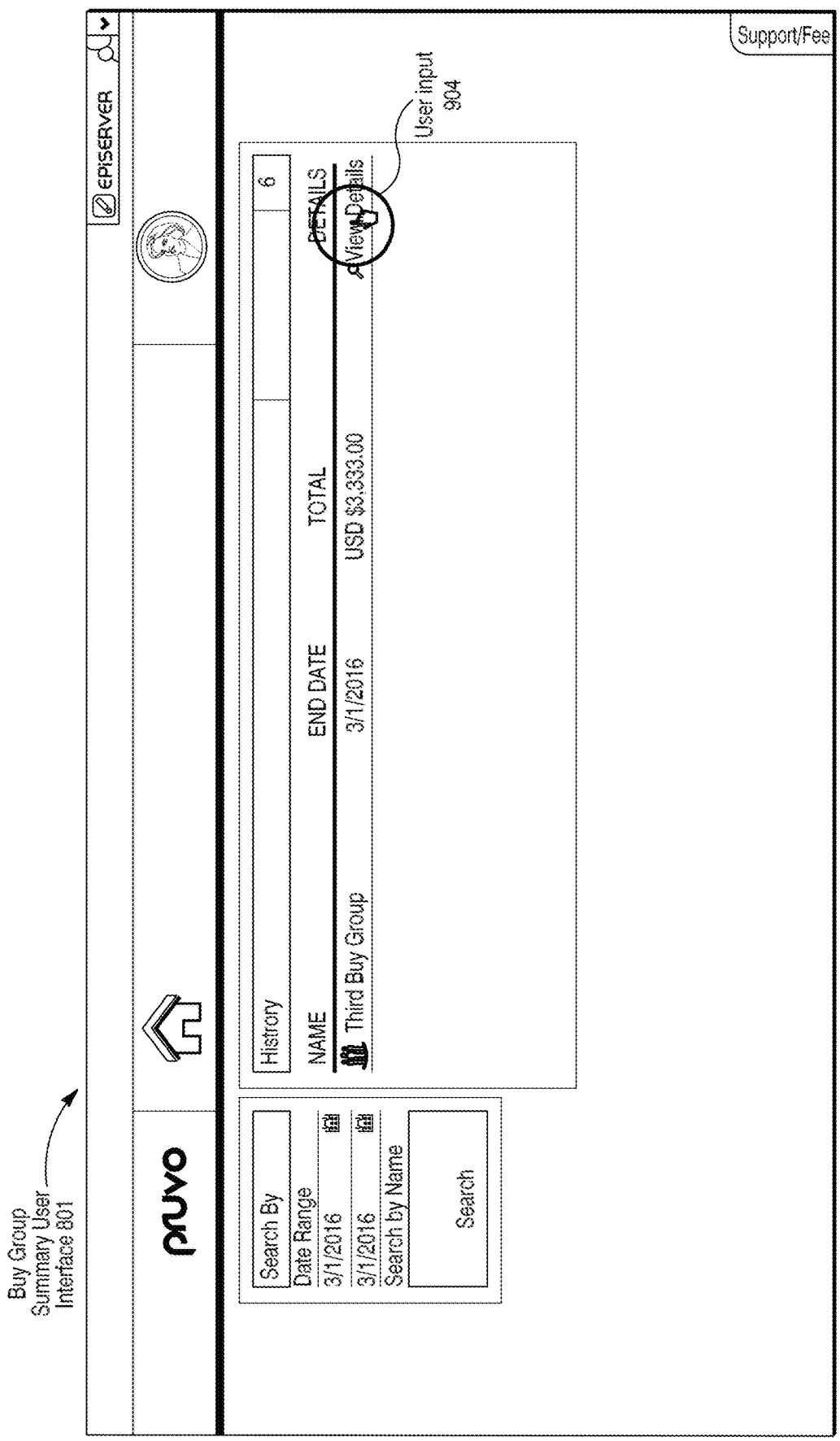
Figure 9B:
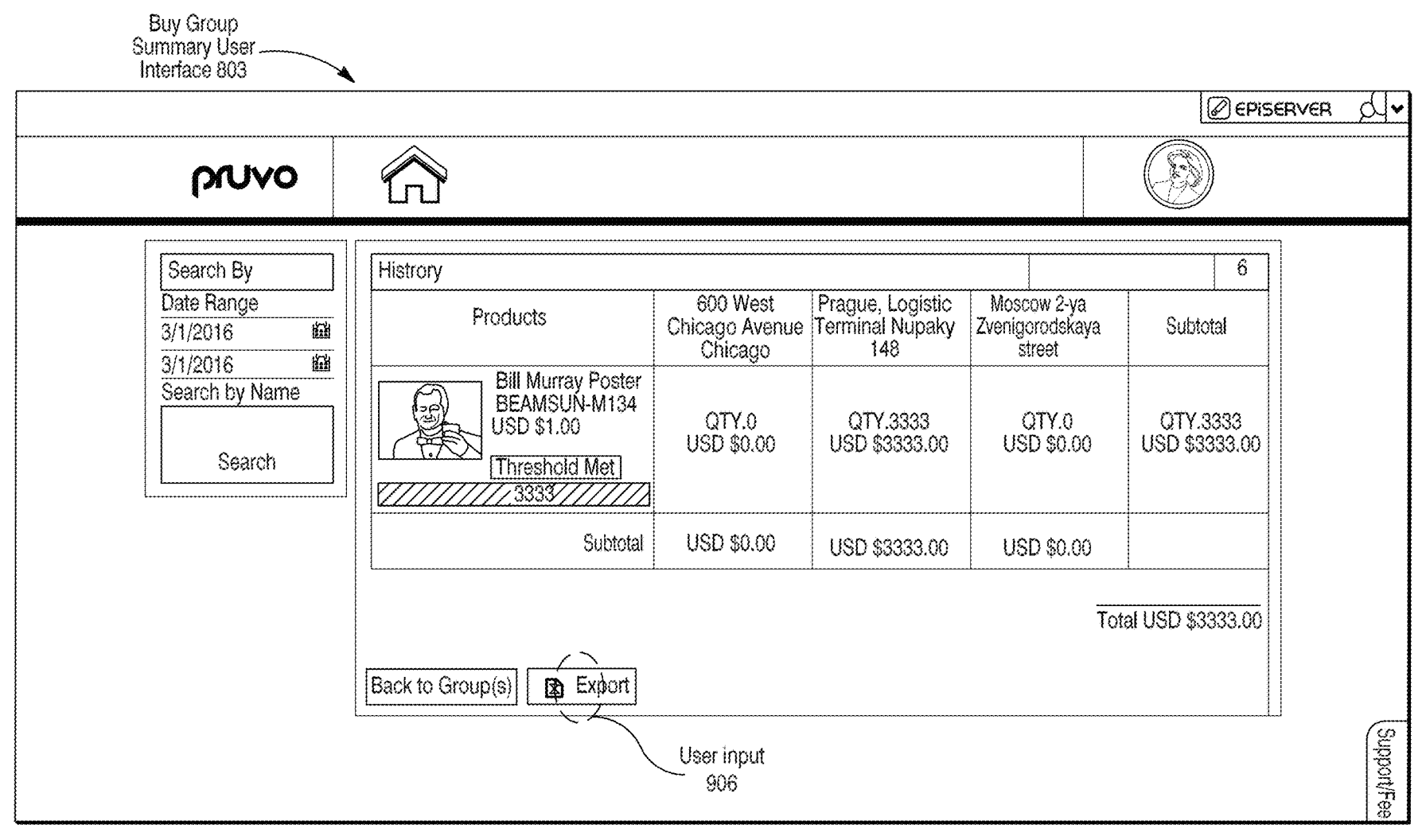
Figure 9C:
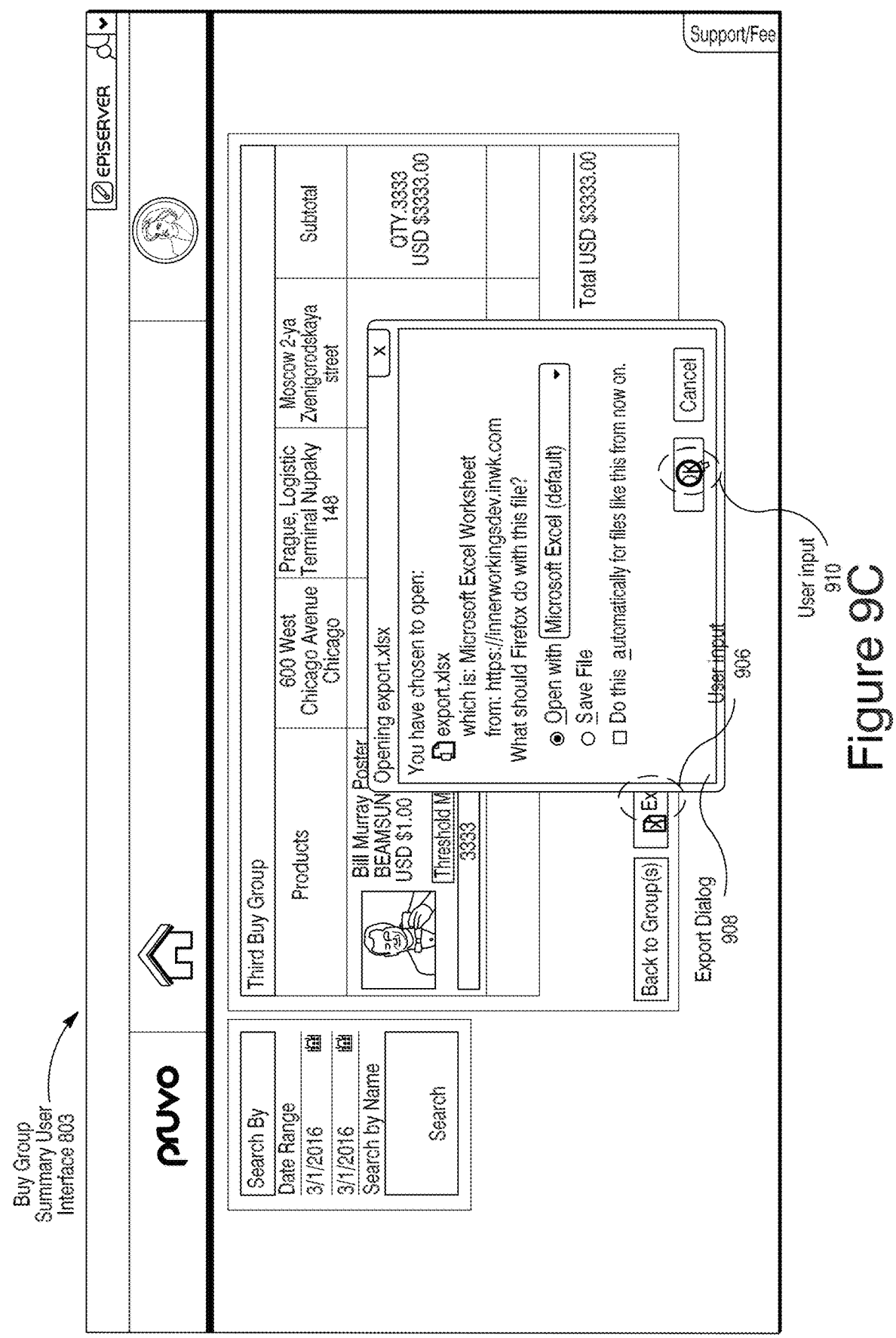

In some embodiments, even after an expiration period for a particular buy group has expired (e.g., the first time period for the fixed plurality is one example of an expiration period), users are provided with ways to access ordering information for the particular buy group. For example, after the first time period has expired, the computing device receives a new request to export ordering information associated with the fixed plurality of physical items in a particular format (e.g., the computing device receives user input 904, FIG. 9A, then receives user input 906, FIG. 9B, and receives user input 910 within export dialog 908, FIG. 9C. In response to receiving the new request, the computing device provides the ordering information in the particular format (as shown in FIG. 9D, the ordering information is available for viewing as a spreadsheet).

As mentioned above, in some embodiments, the fixed plurality is a buy group. In some embodiments, an administrative user sets up the fixed plurality/buy group using a backend interface (as explained below in reference to FIGS. 10A-10I). For example, the administrator/administrative user creates each buy group in an Excel spreadsheet (e.g., such as that shown in FIG. 10D) and imports them into the print procurement system using the interface shown in FIG. 10C. In some embodiments, catalogs of items for each of the buy groups can also be imported into the system easily using an Excel file (FIGS. 10C and 10E). In some embodiments, the first time period, the fixed plurality of physical items, and a respective threshold interest level for each physical image in the fixed plurality were selected by an administrator before the electronic device receives the request to view the ordering information (e.g., using the user interfaces discussed below in reference to FIGS. 10A-10I, the administrator sets up and configures the buy group, which is then available to associated users via the user interfaces discussed herein in reference to FIGS. 8A-8W and 9A-9D).

It should be understood that the particular order in which the operations in FIG. 7 have been described is merely one example and is not intended to indicate that the described order is the only order in which the operations could be performed. One of ordinary skill in the art would recognize various ways to reorder and/or combine the operations described herein. Additionally, it should be noted that other processes such as those described in reference to method 1100 of FIG. 11 can be combined with the processes described in FIG. 7.

In some embodiments, an administrator uses an administrative component of a print procurement application in order to configure buy groups (e.g., for use in conjunction with method 700). FIGS. 10A-10I are schematics of a display used to illustrate example user interfaces for setting up and configuring a buy group via an administrator's component of a print procurement system, in accordance with some embodiments.

As shown in FIG. 10A, a customer management user interface 1002 is available within a print procurement application that allows an administrative user to configure buy groups. In some embodiments, the administrative user selects a view buy groups link 1010 and is then shown all current buy groups 1004 (e.g., all buy groups that are associated with the administrative user, such as customer accounts assigned to a particular PPM or group of PPMs) within the customer management user interface 1002.

In some embodiments, a buy group controls visibility in a catalog of physical items that are available to one or more users associated with the buy group (also referred to as members of the buy group). In some embodiments, all members of the buy group will see the same physical items for the catalog. The view including entered quantities and subtotals will be shared by all members of the buy group (see, e.g., FIGS. 8A-8W and associated descriptions above).

In some embodiments, the administrative user is also able to add new buy groups by selecting either a new buy group link 1006 or by selecting an import buy group link 1008. For example, in response to selection of the new buy group link 1006 (e.g., user input 1014, FIG. 10A), the administrative user is taken to a new buy group creation user interface 1040 (FIG. 10B). As shown in FIG. 10B, the new buy group creation user interface 1040 allows the administrative user to input details related to a new buy group (e.g., a buy group name, buy group locations, a start date, an end date, a catalog, and entries to include in the buy group (i.e., physical items from the catalog)).

In particular, the administrative user may provide a unique name for the buy group within the buy group name field. In some embodiments, this unique name appears to users that are associated with the buy group, so that they are able to distinguish between multiple buy groups that they may be associated with (e.g., as shown in FIG. 8B, user E.M. is associated with two different buy groups, so the buy group name is displayed to help the user distinguish between each buy group). In some embodiments, the administrative user may also provide a listing of locations to which the physical items associated with the buy group would be shipped. In some embodiments, one or more shipping locations must be provided by the administrative user in order to create a new buy group. In some embodiments, the start and end dates define a period of time during which each associated user is able to indicate interest (e.g., a quantity desired) of/in physical items in the buy group. In some embodiments, buy groups are closed at a predetermined time on the end date (e.g., 11:59 PM central time or 5:00 PM central time, or an adjusted time to account for local time zones of users within the buy group).

In some embodiments, after a particular buy group closes, the quantities associated with each physical item in the buy group are committed and, in some embodiments, converted to a purchase order for transmission to appropriate suppliers of each physical item. In some embodiments, only a subset of the physical items are committed and converted to purchase orders, such as only those physical items for which an aggregate interest level exceeds a threshold interest level (as explained above in reference to FIG. 7 and FIGS. 8A-8W).

In some embodiments, the administrative user is able to select a catalog and to then select physical items from within the catalog for inclusion in the buy group.

Turning now to FIG. 10C, buy groups may also be created by importing data from an external file (e.g., an Excel spreadsheet). For example, in response to a selection by the administrative user of the import buy group link 1008 (e.g., user input 1014, FIG. 10A), the administrative user is navigated to an import buy group user interface 1042. In some embodiments, administrative users are able to export a list of buy groups by catalog (as shown in FIG. 10C) and to export a list of active items for a buy group (as shown in FIG. 10C).

In some embodiments, the administrative user selects an Excel spreadsheet in order to quickly create buy groups based on information included in the spreadsheet (such as the spreadsheet shown in FIG. 10D). As shown in FIG. 10D, in some embodiments, the imported spreadsheet includes information identifying a buy group name, shipping locations, start and end dates, and an identifier for a product-specific catalog.

As is also shown in FIG. 10D, in some embodiments, the administrative user has an option to import buy group items as well (e.g., physical items that are available to the users associated with the buy group). For example, the administrative user identifies an external file that includes information about items to include in a buy group (such as an Excel spreadsheet like the one shown in FIG. 10E) and items are then added to respective buy groups (according to information included in the spreadsheet). In some embodiments, the external file includes an identifier for a buy group and an identifier for an item to add to that buy group (e.g., an item code, such as a SKU).

Turning now to FIG. 10F, the administrative user is also able to configure users to be associated with new and existing buy groups, using a configure buy group users 1044 interface. In some embodiments, after creating a new buy group (using either the user interface shown in FIG. 10B or the import process described with respect to FIG. 10C), the administrative user is taken to a user interface similar to that shown in FIG. 10F. As shown in FIG. 10F, the administrative user inputs or selects email and name information for each user who will be associated with the new buy group. In some embodiments, the administrative user may also add users to buy groups by importing information from an external file. For example, the administrative user selects an external file (using an upload buy group users 1046 interface, FIG. 10G) that includes information about one or more users (e.g., Excel sheet shown in FIG. 10H) and the one or more users are then associated with the specified buy group. In some embodiments, the upload buy group users 1046 interface also allows the administrative user to download buy groups by user or by organization (e.g., by selecting an appropriate radio button and clicking a download button, as shown in FIG. 10G).

Turning now to FIG. 10I, a configure buy group items 1050 user interface is shown. The configure buy group items 1050 user interface allows the administrative user to configure details associated with each physical item in a particular buy group. For example and as shown in FIG. 10I, the configure buy group items 1050 user interface allows the administrative user, for a respective physical item within the particular buy group, to input a name, provide availability dates for the respective physical item (e.g., start and expiration dates), provide an indication as to whether this respective physical item is available to the particular buy group, input a code, input a sort order to control how the respective physical item appears relative to other physical items within the buy group (e.g., within the buy group summary user interface 803, such as that shown in FIG. 8C), provide meta class information, indicate whether an image for the respective physical item can be zoomed, provide descriptive information, and provide the image. Importantly, the user interface 1050 also allows the administrative user to use a threshold input 1030 to specify a threshold for the respective physical item, and this threshold corresponds to an interest level (i.e., quantity) at which the respective physical item is available for a particular price (additional information regarding thresholds is provided above in reference to FIG. 7 and FIGS. 8A-8W). In some embodiments, the threshold input 1030 is also displayed adjacent to pricing information for the respective physical item (in this way, the administrative user is able to assess a level to which the threshold should be set). Stated another way, the threshold is the minimum interest quantity that item would need to achieve to ensure that it would be ordered at a particular listed price (such as a special offer price provided by a particular supplier).

In some embodiments, users (associated with a buy group) are not actually purchasing items at the time they are expressing interest in the items right away; instead they are expressing interest in procurement at a later time based on the interest shown in an item across multiple users/buy groups.

In some embodiments, the user interfaces discussed above in reference to FIGS. 10A-10I are displayed on a display (e.g., display 208, FIG. 2) of a computing device (e.g., user computing device 102-1, FIG. 2). The terms administrative user and administrator are used interchangeably herein to refer to a user of the print procurement application that has special access privileges and is thus able to configure high-level information regarding buy groups.

FIG. 11 is a flowchart depicting a method 1100 of a method of efficiently managing buy groups in a print procurement system, in accordance with some embodiments. FIGS. 8A-8W, 9A-9D, and 10A-10I are used to illustrate the methods and/or processes of FIG. 11. In some embodiments, each of the user interfaces presented in FIGS. 8A-8W, 9A-9D, and 10A-10I are presented on a display of a computing device (e.g., display 208 of user computing device 102-1 or on a display for a server system, as pictured for the user interfaces shown in FIGS. 6A-6C).

In some embodiments, the method 1100 is performed by an electronic device (e.g., print procurement server 106, FIGS. 1 and 3) and/or one or more components of the server. In some embodiments, the method 700 is governed by instructions that are stored in a non-transitory computer-readable storage medium and that are executed by one or more processors of the server, such as the one or more processors 302 of server 106-1 (FIG. 3). For ease of explanation, the following describes method 1100 as performed by a server system (e.g., server 106-1, FIG. 3). In some embodiments, with reference to FIG. 3, the operations of method 700 are performed by or use, at least in part, a print procurement web application (e.g., print procurement web application 222), a buy group management module (e.g., buy group management module 110), one or more buy group database(s) (e.g., buy group databases 108), and/or a display (e.g., display 308). Some operations in method 1100 are, optionally, combined and/or the order of some operations is, optionally, changed (e.g., by combining and or replacing some operations with those discussed above in reference to method 700 of FIG. 7).

As described below, the method 1100 provides a fast, intuitive, easy-to-use, and robust way to manage buy groups (and, in particular, ensure that remotely located shipping locations are able to collectively take advantage of threshold-specific pricing options in a print procurement system (in some embodiments, no one shipping location would be able to satisfy the threshold alone)). Furthermore, managing buy groups in this way in print procurement systems allows users to create more sophisticated and efficient marketing campaigns across remotely located offices, thereby allowing users to make better-informed and cost-saving business decisions.

Referring now to FIG. 11, the server system receives (1102), from an administrator (also referred to interchangeably herein as an administrative user), selections of physical items for inclusion in a fixed plurality of physical items (e.g., via selections in a new buy group creation user interface 1040, FIG. 10B, and/or via importing buy group items using an import buy group user interface 1042, FIG. 10C), and each physical item of the fixed plurality of physical items is associated with a threshold interest level (e.g., selected by the administrator using a user interface like the one shown in FIG. 10I by inputting a value in threshold input 1030). In some embodiments and as discussed above, the fixed plurality of physical items is a buy group (1104).

In some embodiments, the server system monitors (1106), for each physical item of the plurality of physical items, respective aggregate interest levels that reflect a quantity of a respective physical item requested by two or more disparately located users associated with distinct shipping locations. In some embodiments, the server system receives information regarding changes to aggregate interest levels from respective computing devices that are associated with various users of the buy group.

While monitoring the respective aggregate interest levels, the server system detects (1108) a change in a first aggregate interest level for a first physical item of the fixed plurality of physical items, and the change is initiated by a user of an electronic device that is distinct from the server system (e.g., such as user input 816, FIG. 8D, changing a current interest level for a Chicago shipping location from 0 to 100, resulting in a corresponding change to the aggregate interest level as well). In some embodiments, the user is associated with at least one of the distinct shipping locations (1110).

In response to detecting the change in the first aggregate interest level for the first physical item, the server system determines (1112) whether the first aggregate interest level satisfies a respective threshold interest level that is associated with the first physical item. In some embodiments and as discussed above, the respective threshold interest level is established by the administrator in conjunction with operation 1102 and is based on supplier-provided pricing data (e.g., supplier-provided pricing data that is displayed near threshold input 1030 in order to provide the administrator with current pricing options to determine where to set the threshold interest level).

In accordance with a determination that the first aggregate interest level satisfies the respective threshold interest level that is associated with the first physical item, the server system sends (1116), to at least the electronic device, an indication that a threshold-specific price for the first physical item has been secured. The indication allows the electronic device to display a visual representation that the threshold-specific price has been secured (e.g., such as threshold progress indicators 812-1 and 812-2, FIG. 8G).

It should be understood that the particular order in which the operations in FIG. 11 have been described is merely one example and is not intended to indicate that the described order is the only order in which the operations could be performed. One of ordinary skill in the art would recognize various ways to reorder and/or combine the operations described herein. Additionally, it should be noted that other processes such as those described in reference to method 700 of FIG. 7 can be combined with the processes described in FIG. 11.

The terminology used in the description of the invention herein is for the purpose of describing particular embodiments only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

It will also be understood that, although the terms "first," "second," etc. may be used herein to describe various elements, these elements should not be limited by these terms. These terms are only used to distinguish one element from another. For example, a first region could be termed a second region, and, similarly, a second region could be termed a first region, without changing the meaning of the description, so long as all occurrences of the "first region" are renamed consistently and all occurrences of the "second region" are renamed consistently. The first region and the second region are both regions, but they are not the same region.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method, comprising:
   at an electronic device with one or more processors and memory, wherein the electronic device is in communication with a display and an input device:
   displaying, by the one or more processors, on the display, ordering information for a fixed plurality of physical items, the fixed plurality of physical items including a respective user interface object for each physical item, wherein:
   the fixed plurality of physical items are associated with a first time period, the first time period spanning a start date and an end date for indicating an interest level in one or more items of the fixed plurality of physical items,
   the respective user interface objects include a visual representation of an aggregate interest level for each physical item during the first time period as compared to a threshold interest level for each physical item, and
   the aggregate interest level reflects a quantity of each physical item requested by a first user and at least one other user;
   while displaying the respective user interface objects for each physical item of the fixed plurality of physical items, receiving a first indication that a second user, distinct from the first user, is modifying ordering information for a first physical item of the fixed plurality of physical items; and
   in response to receiving the first indication that the second user is modifying ordering information, updating a first user interface object for the first physical item to indicate that the second user is modifying ordering information for the first physical item.

2. The method of claim 1, further comprising:
   while displaying the respective user interface objects for each physical item of the fixed plurality of physical items, receiving a second indication that a third user, distinct from the first and second users, is modifying ordering information for a second physical item of the fixed plurality of physical items;
   in response to receiving the second indication that the third user is modifying ordering information, updating a second user interface object for the second physical item to indicate that the third user is modifying ordering information for the second physical item.

3. The method of claim 2, wherein the first physical item and the second physical item are distinct.

4. The method of claim 2, wherein the first physical item and the second physical item are the same.

5. The method of claim 2, further comprising:
   while displaying the respective user interface objects for each physical item of the fixed plurality of physical items, receiving a third indication that a fourth user, distinct from the first, second, and third users, is modifying ordering information for a third physical item of the fixed plurality of physical items;
   in response to receiving the third indication that the fourth user is modifying ordering information, updating a third user interface object for the third physical item to indicate that the fourth user is modifying ordering information for the third physical item.

6. The method of claim 5, wherein the first, second, and third physical item are distinct.

7. The method of claim 5, wherein the first, second, and third physical item are the same.

8. The method of claim 5, wherein the first, second, and third indications that the second, third, and fourth users are modifying ordering information includes displaying respective colors corresponding to the second, third, and fourth user on the respective physical item being modified by the respective user.

9. The method of claim 8, wherein the first, second, and third physical items are associated with one or more distinct shipping locations and the respective colors corresponding to the second, third, and fourth users are displayed on respective shipping locations of the first, second, and third physical items being modified being modified by the second, third, and fourth users.

10. The method of claim 1, wherein the first indication that the second user is modifying ordering information includes displaying a color corresponding to the second user on the first physical item being modified by the second user.

11. The method of claim 10, wherein the first physical item is associated with one or more distinct shipping locations and the color corresponding to the second user is displayed on a respective shipping location of the first physical item being modified being modified by the second user.

12. The method of claim 11, wherein the first user interface object for the first physical object includes a respective numerical value that reflects a respective interest level for at least two of the one or more shipping locations.

13. The method of claim 11, wherein the one or more shipping locations are locations to which the physical items are to be shipped.

14. The method of claim 10, further comprising displaying, by the one or more processors, on the display, a user identification object that includes one or more distinct colors corresponding to the second user and at least one other user.

15. The method of claim 14, further comprising:
detecting an input over the user identification object; and
in response to detecting the input, repositioning the user identification object on the display based on movement of the input.

16. The method of claim 1, wherein the first user and the at least one other user are each associated with distinct shipping locations and the aggregate interest level reflects interest levels across one or more shipping locations, the one or more shipping locations including the distinct shipping locations.

17. The method of claim 1, wherein the visual representation includes a progress bar and a textual description as to whether the threshold interest level for the first physical item has been met.

18. The method of claim 1, wherein a respective threshold interest level is associated with a current supplier-provided sale price for a respective physical item.

19. A non-transitory computer-readable storage medium storing executable instructions that, when executed by an electronic device with a touch-sensitive display and an input device, cause the electronic device to:
display, by one or more processors, on the display, ordering information for a fixed plurality of physical items, the fixed plurality of physical items including a respective user interface object for each physical item, wherein:
the fixed plurality of physical items are associated with a first time period, the first time period spanning a start date and an end date for indicating an interest level in one or more items of the fixed plurality of physical items,
the respective user interface objects include a visual representation of an aggregate interest level for each physical item during the first time period as compared to a threshold interest level for each physical item, and
the aggregate interest level reflects a quantity of each physical item requested by a first user and at least one other user;
while displaying the respective user interface objects for each physical item of the fixed plurality of physical items, receive a first indication that a second user, distinct from the first user, is modifying ordering information for a first physical item of the fixed plurality of physical items; and
in response to receiving the first indication that the second user is modifying ordering information, update a first user interface object for the first physical item to indicate that the second user is modifying ordering information for the first physical item.

20. An electronic device, comprising:
a display;
an input device;
one or more processors; and
memory storing one or more programs which, when executed by the one or more processors, cause the electronic device to:
display, by the one or more processors, on the display, ordering information for a fixed plurality of physical items, the fixed plurality of physical items including a respective user interface object for each physical item, wherein:
the fixed plurality of physical items are associated with a first time period, the first time period spanning a start date and an end date for indicating an interest level in one or more items of the fixed plurality of physical items,
the respective user interface objects include a visual representation of an aggregate interest level for each physical item during the first time period as compared to a threshold interest level for each physical item, and
the aggregate interest level reflects a quantity of each physical item requested by a first user and at least one other user;
while displaying the respective user interface objects for each physical item of the fixed plurality of physical items, receive a first indication that a second user, distinct from the first user, is modifying ordering information for a first physical item of the fixed plurality of physical items; and
in response to receiving the first indication that the second user is modifying ordering information, update a first user interface object for the first physical item to indicate that the second user is modifying ordering information for the first physical item.

\* \* \* \* \*